(12) United States Patent
Li et al.

(10) Patent No.: US 12,570,314 B2
(45) Date of Patent: *Mar. 10, 2026

(54) RADAR SENSOR SYSTEM FOR VEHICLES

(71) Applicant: Aurora Operations, Inc., Pittsburgh, PA (US)

(72) Inventors: Bo Li, Pittsburgh, PA (US); Chunshu Li, San Jose, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 262 days.

This patent is subject to a terminal disclaimer.

(21) Appl. No.: 18/520,003

(22) Filed: Nov. 27, 2023

(65) Prior Publication Data

US 2024/0140480 A1 May 2, 2024

Related U.S. Application Data

(63) Continuation of application No. 17/972,219, filed on Oct. 24, 2022, now Pat. No. 11,884,292.

(51) Int. Cl.
B60W 60/00 (2020.01)
G01S 13/89 (2006.01)

(52) U.S. Cl.
CPC ........... B60W 60/001 (2020.02); G01S 13/89 (2013.01); B60W 2300/12 (2013.01);
(Continued)

(58) Field of Classification Search
CPC .......... B60W 60/001; B60W 2554/40; B60W 2556/35; B60W 2420/408; B60W 2300/12; G01S 13/89
(Continued)

(56) References Cited

U.S. PATENT DOCUMENTS 8,427,372 B2 * 4/2013 Sakai ....................... H01Q 3/30
342/373
10,248,124 B2 * 4/2019 Bellaiche ........... G01C 21/3658
(Continued)

FOREIGN PATENT DOCUMENTS

WO WO2010064723 6/2010
WO WO-2019060524 A1 * 3/2019 ............. G01S 13/60
(Continued)

OTHER PUBLICATIONS

Bialer, O. et al. "Performance Evaluation of Wide Aperture Radar for Automotive Applications", 2020 IEEE Radar Conference, pp. 1-6.
(Continued)

*Primary Examiner* — Nuzhat Pervin
(74) *Attorney, Agent, or Firm* — Dority & Manning, P.A.

(57) ABSTRACT

A radio detection and ranging (RADAR) sensor system for vehicles, such as autonomous vehicles, includes a first RADAR sensor configured to provide first RADAR data descriptive of an environment of a vehicle having a first antenna configured to output a first RADAR beam having a first azimuthal component over a first angular range and a second RADAR sensor configured to provide second RADAR data descriptive of the environment of the vehicle, the second RADAR sensor having a second antenna configured to output a second RADAR beam having a second azimuthal component that is narrower than the first azimuthal component of the first RADAR beam, wherein the second RADAR sensor is configured to sweep the second RADAR beam over a second angular range closer to a rear of the vehicle than a front of the vehicle to obtain the second RADAR data.

20 Claims, 13 Drawing Sheets

(52) U.S. Cl.
CPC ... *B60W 2420/408* (2024.01); *B60W 2554/40* (2020.02); *B60W 2556/35* (2020.02)

(58) Field of Classification Search
USPC ........................................................ 342/449
See application file for complete search history.

(56) References Cited

U.S. PATENT DOCUMENTS

| | | | | |
|---|---|---|---|---|
| 10,404,261 | B1 * | 9/2019 | Josefsberg | G01S 13/931 |
| 10,737,717 | B2 * | 8/2020 | Peng | G06N 3/04 |
| 10,937,178 | B1 * | 3/2021 | Srinivasan | G06T 7/521 |
| 11,106,218 | B2 * | 8/2021 | Levinson | G05D 1/2249 |
| 11,353,578 | B2 * | 6/2022 | Wang | G01S 13/42 |
| 12,360,212 | B2 * | 7/2025 | Blaes | G01S 7/412 |
| 2017/0210359 | A1 * | 7/2017 | Brandin | B60W 30/09 |
| 2018/0106896 | A1 * | 4/2018 | Rohani | G01S 13/89 |
| 2019/0094878 | A1 * | 3/2019 | Campbell | G01S 13/931 |
| 2019/0137601 | A1 * | 5/2019 | Driscoll | G01S 13/424 |
| 2019/0277962 | A1 * | 9/2019 | Ingram | G01S 13/865 |
| 2019/0383901 | A1 * | 12/2019 | Elad | G01S 13/42 |
| 2019/0384294 | A1 * | 12/2019 | Shashua | G01C 21/3476 |
| 2019/0391250 | A1 * | 12/2019 | Cohen | G01S 13/87 |
| 2020/0042001 | A1 * | 2/2020 | Chu | G01S 13/931 |
| 2020/0077279 | A1 * | 3/2020 | Foerster | H04B 7/0408 |
| 2020/0174115 | A1 * | 6/2020 | Prados | G01S 13/931 |
| 2020/0241122 | A1 * | 7/2020 | Achour | G01S 13/931 |
| 2020/0278440 | A1 * | 9/2020 | Wang | G01S 13/584 |
| 2020/0341118 | A1 * | 10/2020 | Chen | G05D 1/0088 |
| 2020/0371228 | A1 * | 11/2020 | Wang | G01S 13/874 |
| 2021/0055375 | A1 * | 2/2021 | Smith | G01S 7/295 |
| 2021/0063560 | A1 * | 3/2021 | Bosse | G01S 13/93 |
| 2021/0080568 | A1 * | 3/2021 | Brown | G01S 13/87 |
| 2021/0089047 | A1 * | 3/2021 | Smith | G01S 7/06 |
| 2021/0197815 | A1 * | 7/2021 | Pitzer | B60W 30/143 |
| 2021/0208272 | A1 * | 7/2021 | Lavian | H03L 7/091 |
| 2021/0223359 | A1 * | 7/2021 | Harrison | G01S 13/89 |
| 2021/0239788 | A1 * | 8/2021 | Arage | G01S 7/032 |
| 2021/0278523 | A1 * | 9/2021 | Urtasun | G01S 13/931 |
| 2021/0287548 | A1 * | 9/2021 | Lai | B60R 1/025 |
| 2022/0025272 | A1 * | 1/2022 | Patten | C10B 53/06 |
| 2022/0029305 | A1 * | 1/2022 | Achour | G01S 13/865 |
| 2022/0231406 | A1 * | 7/2022 | Kurz | H01Q 21/00 |
| 2022/0252721 | A1 | 8/2022 | Carroll | |
| 2022/0297706 | A1 * | 9/2022 | Nilsson | G06V 10/80 |
| 2022/0308204 | A1 * | 9/2022 | Zaidi | G01S 13/426 |
| 2022/0342035 | A1 * | 10/2022 | Smith | G01S 13/426 |
| 2022/0392232 | A1 * | 12/2022 | Aguiar | G06T 7/80 |
| 2022/0393341 | A1 * | 12/2022 | Shams | H01Q 21/28 |
| 2023/0003871 | A1 * | 1/2023 | Qian | G06N 20/00 |
| 2023/0003872 | A1 * | 1/2023 | Qian | G01S 13/723 |
| 2023/0147070 | A1 * | 5/2023 | Driscoll | G01S 7/03 342/175 |
| 2025/0138149 | A1 * | 5/2025 | Sanson | G01S 7/411 |

FOREIGN PATENT DOCUMENTS

| | | | | |
|---|---|---|---|---|
| WO | WO-2020176483 A1 * | 9/2020 | | G01S 13/42 |
| WO | WO2021209225 | 10/2021 | | |
| WO | WO-2021209225 A1 * | 10/2021 | | G01S 13/931 |

OTHER PUBLICATIONS

Machine translation of WO-2021209225 from ESpacenet; downloaded May 5, 2023 (Year: 2023).
Scheiner, N. et al. "Object detection for automotive radar point clouds—a comparison", AI Perspectives (2021) 3:6.

* cited by examiner

350

352

300

330

304

302

320

306

1000

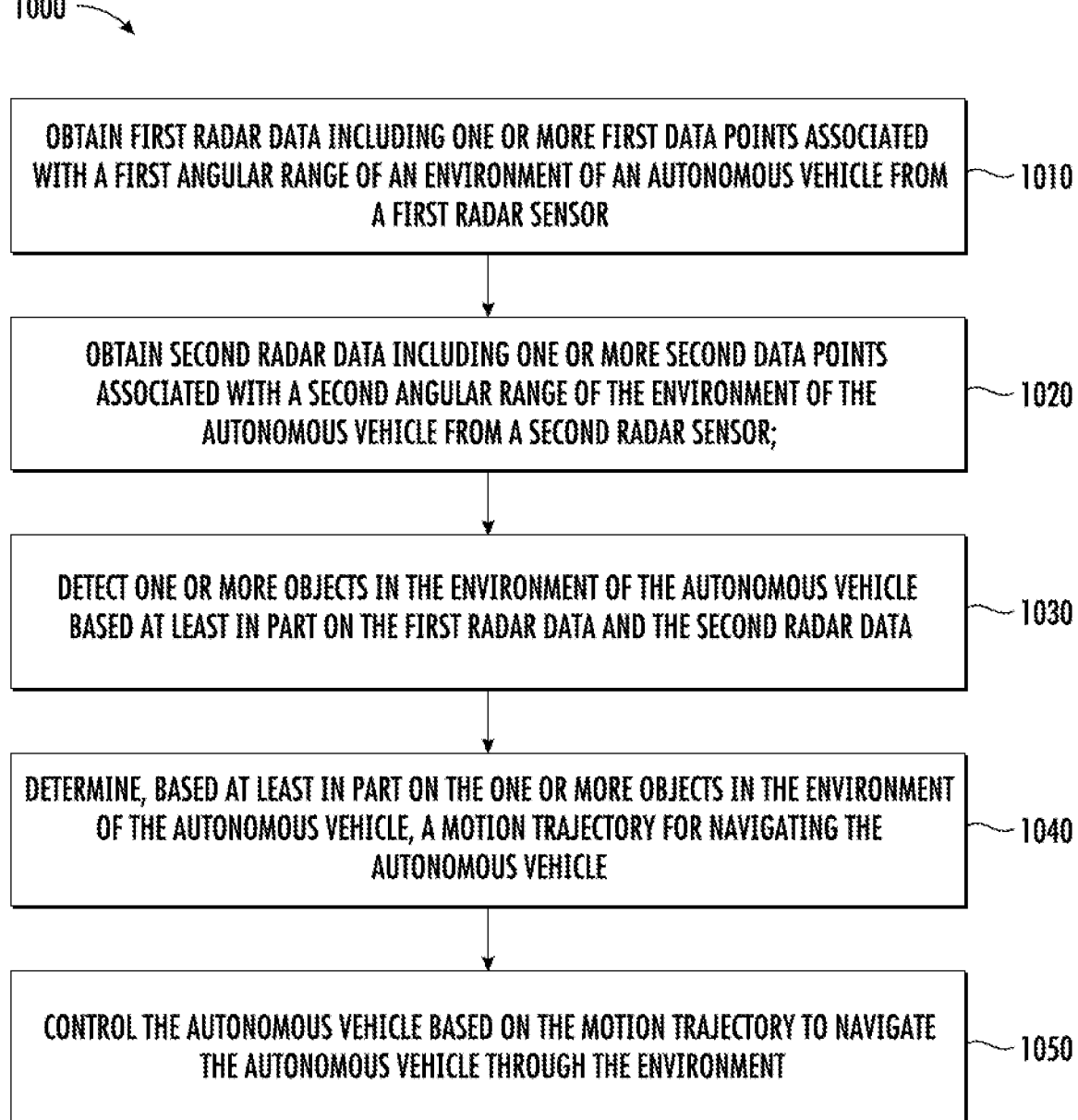

OBTAIN FIRST RADAR DATA INCLUDING ONE OR MORE FIRST DATA POINTS ASSOCIATED WITH A FIRST ANGULAR RANGE OF AN ENVIRONMENT OF AN AUTONOMOUS VEHICLE FROM A FIRST RADAR SENSOR — 1010

OBTAIN SECOND RADAR DATA INCLUDING ONE OR MORE SECOND DATA POINTS ASSOCIATED WITH A SECOND ANGULAR RANGE OF THE ENVIRONMENT OF THE AUTONOMOUS VEHICLE FROM A SECOND RADAR SENSOR; — 1020

DETECT ONE OR MORE OBJECTS IN THE ENVIRONMENT OF THE AUTONOMOUS VEHICLE BASED AT LEAST IN PART ON THE FIRST RADAR DATA AND THE SECOND RADAR DATA — 1030

DETERMINE, BASED AT LEAST IN PART ON THE ONE OR MORE OBJECTS IN THE ENVIRONMENT OF THE AUTONOMOUS VEHICLE, A MOTION TRAJECTORY FOR NAVIGATING THE AUTONOMOUS VEHICLE — 1040

CONTROL THE AUTONOMOUS VEHICLE BASED ON THE MOTION TRAJECTORY TO NAVIGATE THE AUTONOMOUS VEHICLE THROUGH THE ENVIRONMENT — 1050

FIRST COMPUTING SYSTEM 20

COMPUTING DEVICE(S) 21

PROCESSOR(S) 22

MEMORY 23

DATA 24

INSTRUCTIONS 25

MODEL(S) 26

COMM. INTERFACE(S) 27

NETWORK(S) 60

SECOND COMPUTING SYSTEM 40

COMPUTING DEVICE(S) 41

PROCESSOR(S) 42

MEMORY 43

DATA 44

INSTRUCTIONS 45

MODEL(S) 46

MODEL TRAINER(S) 47

TRAINING DATA 48

COMM. INTERFACE(S) 49

RADAR SENSOR SYSTEM FOR VEHICLES

PRIORITY CLAIM

The present application is a Continuation of U.S. patent application Ser. No. 17/972,219 filed Oct. 24, 2022. Applicant claims priority to and the benefit of such application and incorporates such application herein by reference in its entirety.

BACKGROUND

An autonomous platform can process data to perceive an environment through which the autonomous platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

An autonomous vehicle, such as an autonomous vehicle towing a trailer (e.g., an autonomous truck) can navigate through the use of a RADAR system. The RADAR system may be, for example, a MIMO RADAR system. The azimuthal components of a RADAR beam output by the MIMO RADAR system can reflect off the sidewalls of the trailer, providing false detections of objects, multipath ghosts, interference, and other complications.

According to example aspects of the present disclosure, however, a second RADAR beam, such as a "pencil beam" directed primarily in one direction, can supplement detections from the first RADAR beam in regions on the autonomous vehicle that are sensitive to multipath interference, such as in an angular range bordering the trailer. Additionally, the first RADAR beam may not be directed in at least a portion of the angular range covered by the second RADAR beam. Because the second RADAR beam is narrower, less energy from azimuthal components of the second beam reflects off the sidewalls of the trailer, thereby reducing multipath interference. Additionally and/or alternatively, because the second RADAR beam is more concentrated than the first RADAR beam in a singular direction (e.g., with less energy on azimuthal extremes), the second RADAR beam can provide an increased range of detection of objects, including smaller objects (e.g., motorcycles, pedestrians, etc.) in the angular range covered by the second beam. This can help detect objects within "blind spots" of the autonomous truck.

Example aspects of the present disclosure provide for a number of technical effects and benefits. As one example, aspects of the present disclosure can provide for improved detection of objects in an environment proximate to an autonomous platform. For instance, the use of a second RADAR sensor having a second antenna configured to output a second RADAR beam having a second (e.g., narrow) azimuthal component can reduce the effects of multipath interference from portions of the autonomous platform, thereby increasing the accuracy of sensor data from the RADAR system. Furthermore, the reduced multipath interference can lead to improved understanding of the environment of the autonomous vehicle, which can provide for more efficient and/or accurate motion planning for the autonomous vehicle. For instance, a motion plan of an autonomous vehicle may not have to account for a falsely-detected object caused by multipath interference, which can provide for the motion plan to take a more efficient path than if it were to have to "avoid" the falsely-detected object. Additionally and/or alternatively, example aspects of the present disclosure can reduce fuel consumption as well as improve motion planning performance by autonomous vehicles by improving efficiency of handling certain scenarios such as lane changes, merging from a road shoulder, avoiding static objects and/or lane closures, and so on. Furthermore, example aspects of the present disclosure can improve the functionality of computer-related technologies by reducing computing resource usage lost to multipath interference, such as processing (e.g., filtering) techniques, data point storage associated with false multipath points, and so on.

For example, in an aspect, the present disclosure provides a radio detection and ranging (RADAR) sensor system for vehicles, such as autonomous vehicles. The RADAR sensor system includes a first RADAR sensor configured to generate first RADAR data descriptive of an environment of a vehicle having a first antenna configured to output a first RADAR beam having a first azimuthal component over a first angular range and a second RADAR sensor configured to provide second RADAR data descriptive of the environment of the vehicle. The second RADAR sensor includes a second antenna configured to output a second RADAR beam having a second azimuthal component that is narrower than the first azimuthal component of the first RADAR beam. The second RADAR sensor is configured to sweep the second RADAR beam over a second angular range closer to a rear of the vehicle than a front of the vehicle to obtain the second RADAR data.

In some implementations, the first antenna includes a MIMO antenna.

In some implementations, the second antenna includes a beam steering antenna that is directed to a trailer coupled to the vehicle.

In some implementations, the vehicle can be or can include an autonomous truck

In some implementations, the first angular range is configured to cover the front of the vehicle.

In some implementations, the second angular range is configured to be proximate to a trailer coupled to the vehicle.

In some implementations, a transmit pattern of the second antenna includes power focused in a second azimuthal component with less than 1 degree azimuthal span and greater than 0.1 degree azimuthal span.

In some implementations, a transmit pattern of the first antenna includes power radiated over a first azimuthal component with more than 120 degree azimuthal span and less than 180 degree azimuthal span.

In some implementations, the second angular range includes less than thirty degrees and greater than zero degrees.

In another example aspect, the present disclosure provides an autonomous vehicle control system including: (a) one or more processors; and (b) one or more non-transitory, computer-readable media storing instructions that are executable to cause the one or more processors to perform operations. The operations include obtaining first RADAR data including one or more first data points associated with a first angular range of an environment of an autonomous vehicle from a first RADAR sensor. The first RADAR sensor includes a first antenna configured to output a first RADAR beam having a first azimuthal component. The operations include obtaining second RADAR data including one or more second data points associated with a second angular range of the environment of the autonomous vehicle from a second RADAR sensor. Obtaining the second RADAR data includes sweeping the second RADAR beam over a second angular range. The second RADAR sensor includes a second antenna configured to output a second RADAR beam having a second azimuthal component that is narrower than the first azimuthal component of the first RADAR beam. The second RADAR sensor is configured to sweep the second RADAR beam over the second angular range which is closer to a rear of the autonomous vehicle than a front of the autonomous vehicle to obtain the second RADAR data. The operations include detecting one or more objects in the environment of the autonomous vehicle based on the first RADAR data and the second RADAR data.

In some implementations, detecting one or more objects in the environment of the autonomous vehicle based on the first RADAR data and the second RADAR data includes providing the first RADAR data and the second RADAR data to a perception system of the autonomous vehicle.

In some implementations, providing the first RADAR data and the second RADAR data to a perception system includes providing the first RADAR data and the second RADAR data to a sensor data fusion module configured to fuse at least the first RADAR data and the second RADAR data to generate fused RADAR data including a point-cloud representation of the environment of the autonomous vehicle.

In some implementations, sweeping the second RADAR beam over the second angular range includes: broadcasting the second RADAR beam in a first angular direction of the second angular range; obtaining a first portion of the second RADAR data associated with the first angular direction with the second RADAR beam broadcasted in the first angular direction; broadcasting the second RADAR beam in a second angular direction of the second angular range; and obtaining a second portion of the second RADAR data associated with the second angular direction with the second RADAR beam broadcasted in the second angular direction.

In some implementations, the operations further include: determining, based on the one or more objects in the environment of the autonomous vehicle, a motion trajectory for navigating the autonomous vehicle; and controlling the autonomous vehicle based on the motion trajectory to navigate the autonomous vehicle through the environment.

In some implementations, the autonomous vehicle comprises an autonomous truck.

In some implementations, the second RADAR sensor is positioned on a rear portion of the autonomous truck.

In some implementations, the autonomous truck includes a sensor bed positioned above a cabin of the autonomous truck, wherein the second RADAR sensor is positioned within the sensor bed.

In another example aspect the present disclosure provides an autonomous vehicle. The autonomous vehicle includes a first RADAR sensor including a first antenna configured to output a first RADAR beam over a first angular range, the first RADAR beam having a first azimuthal component. The autonomous vehicle includes a second RADAR sensor including a second antenna configured to output a second RADAR beam having a second azimuthal component that is narrower than the first azimuthal component of the first RADAR beam. The second RADAR sensor is configured to sweep the second RADAR beam over a second angular range which is closer to a rear of the autonomous vehicle than a front of the autonomous vehicle. The autonomous vehicle includes an autonomous vehicle control system. The autonomous vehicle control system includes one or more processors and one or more non-transitory, computer-readable media storing instructions that are executable to cause the one or more processors to perform operations. The operations include obtaining first RADAR data including one or more first data points associated with the first angular range of an environment of the autonomous vehicle from the first RADAR sensor. The operations include obtaining second RADAR data including one or more second data points associated with the second angular range of the environment of the autonomous vehicle from second RADAR sensor. Obtaining the second RADAR data includes sweeping the second RADAR beam over the second angular range. The operations include detecting one or more objects in the environment of the autonomous vehicle based on the first RADAR data and the second RADAR data.

In some implementations, the operations include: determining, based on the one or more objects in the environment of the autonomous vehicle, a motion trajectory for navigating the autonomous vehicle; and controlling the autonomous vehicle based on the motion trajectory to navigate the autonomous vehicle through the environment.

In some implementations, sweeping the second RADAR beam over the second angular range includes: broadcasting the second RADAR beam in a first angular direction of the second angular range; obtaining a first portion of the second RADAR data associated with the first angular direction with the second RADAR beam broadcasted in the first angular direction; broadcasting the second RADAR beam in a second angular direction of the second angular range; and obtaining a second portion of the second RADAR data associated with the second angular direction with the second RADAR beam broadcasted in the second angular direction.

In some implementations, detecting one or more objects in the environment of the autonomous vehicle based on the first RADAR data and the second RADAR data includes providing the first RADAR data and the second RADAR data to a perception system of the autonomous vehicle. Providing the first RADAR data and the second RADAR data to the perception system includes providing the first RADAR data and the second RADAR data to a sensor data fusion module configured to fuse at least the first RADAR data and the second RADAR data to generate fused RADAR data including a point-cloud representation of the environment of the autonomous vehicle.

Other example aspects of the present disclosure are directed to other systems, methods, vehicles, apparatuses, tangible non-transitory computer-readable media, and devices for operation of a RADAR sensor system, or systems including a RADAR sensor system, as well as processing and utilizing the associated sensor data for system control.

These and other features, aspects and advantages of various implementations of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

FIG. 10 is a flowchart of a method according to some implementations of the present disclosure.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems. As used herein, "about" in conjunction with a stated numerical value is intended to refer to within 20 percent of the stated numerical value, except where otherwise indicated.

Figure 1:
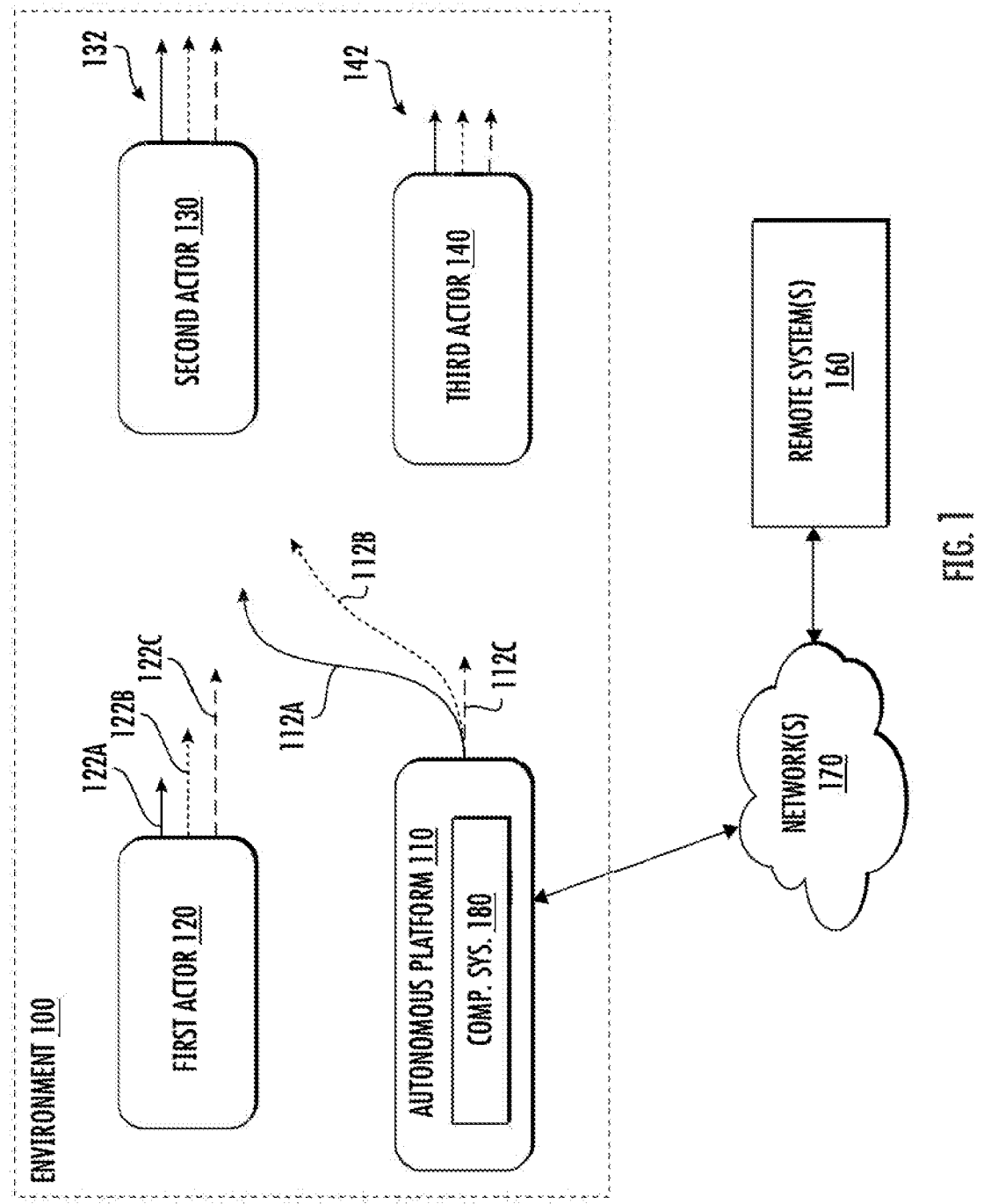
FIG. 1 is a block diagram of an example operating scenario according to some implementations of the present disclosure.

With reference to FIGS. 1-11, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
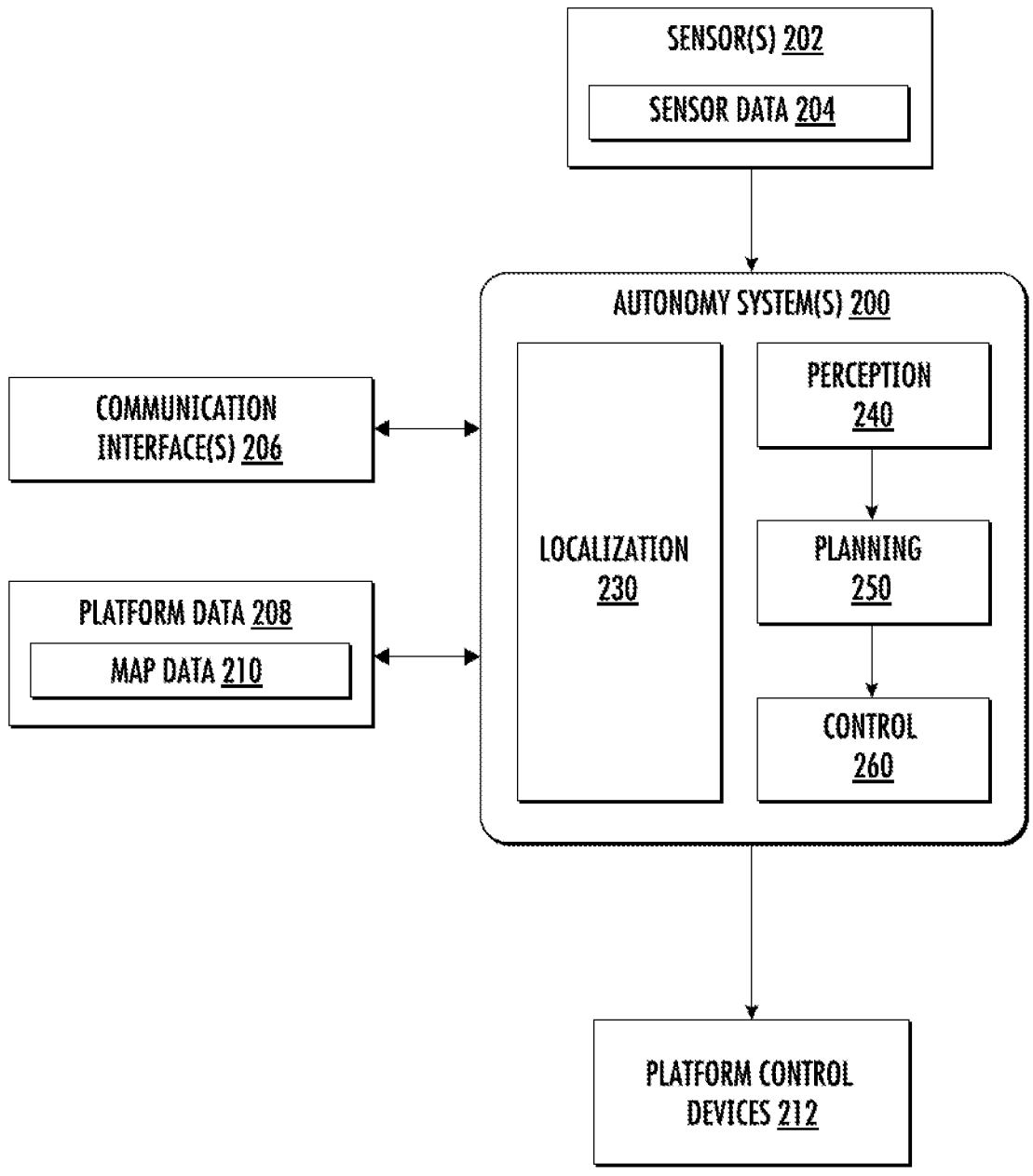
FIG. 2 is a block diagram of example autonomy system(s) for an autonomous platform according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a driver assistance (e.g., advanced driver assistance or ADAS) operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

Example aspects of the present disclosure provide for a RADAR system having a second (e.g., narrow) azimuthal profile to identify objects in angular ranges of the environment of the autonomous platform that are sensitive to multipath interference, such as rear-facing angular ranges proximate to sidewalls of the trailer. For instance, a subset of the entire angular range of the autonomous platform may be covered by this narrower RADAR system, such as an angular range bounded on one side by the sidewalls of the trailer. A narrow (e.g., less than 1 degree azimuthal) beam from the RADAR system can be swept over the angular range to identify objects in this angular range. In addition, because the beam-sweeping approach may be slower and/or have a higher hardware cost than other antenna systems, a wider-band RADAR system can be used to identify objects in the remaining angular range. Thus, the autonomous platform can identify objects over a greater angular range while avoiding multipath interference caused by some conventional RADAR systems.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate. The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figures 3A, 3B:
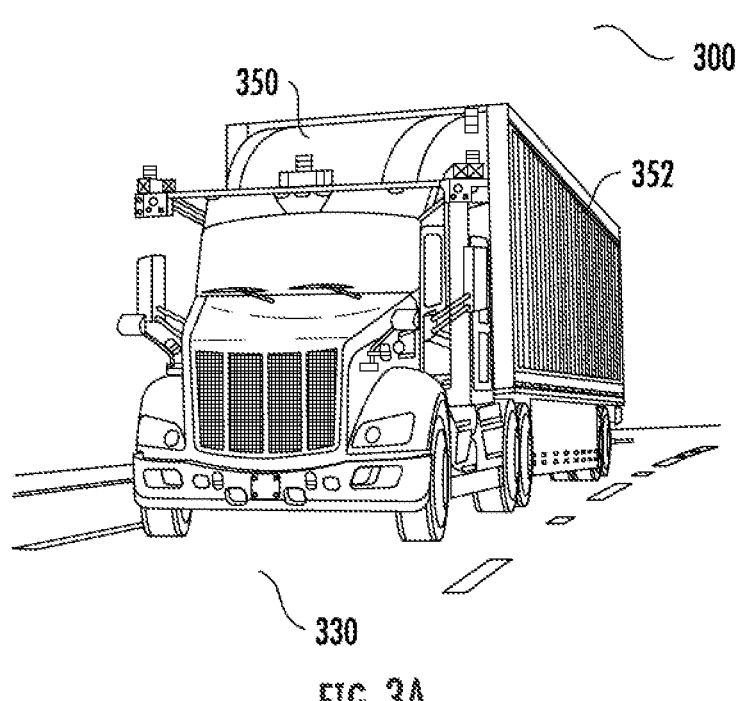
FIGS. 3A-3C are an example operating environment for an autonomous platform according to some implementations of the present disclosure.

For example, with reference to FIG. 3A, an operational environment can include a dense environment 300. An autonomous platform can include an autonomous vehicle 350 controlled by the autonomy system 200. In some implementations, the autonomous vehicle 350 can be configured for maneuverability in a dense environment, such as with a configured wheelbase or other specifications. In some implementations, the autonomous vehicle 350 can be configured for transporting cargo or passengers. In some implementations, the autonomous vehicle 350 can be configured to transport numerous passengers (e.g., a passenger van, a shuttle, a bus, etc.). In some implementations, the autonomous vehicle 350 can be configured to transport cargo 352, such as large quantities of cargo (e.g., a truck, a box van, a step van, etc.) or smaller cargo (e.g., food, personal packages, etc.).

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 350. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
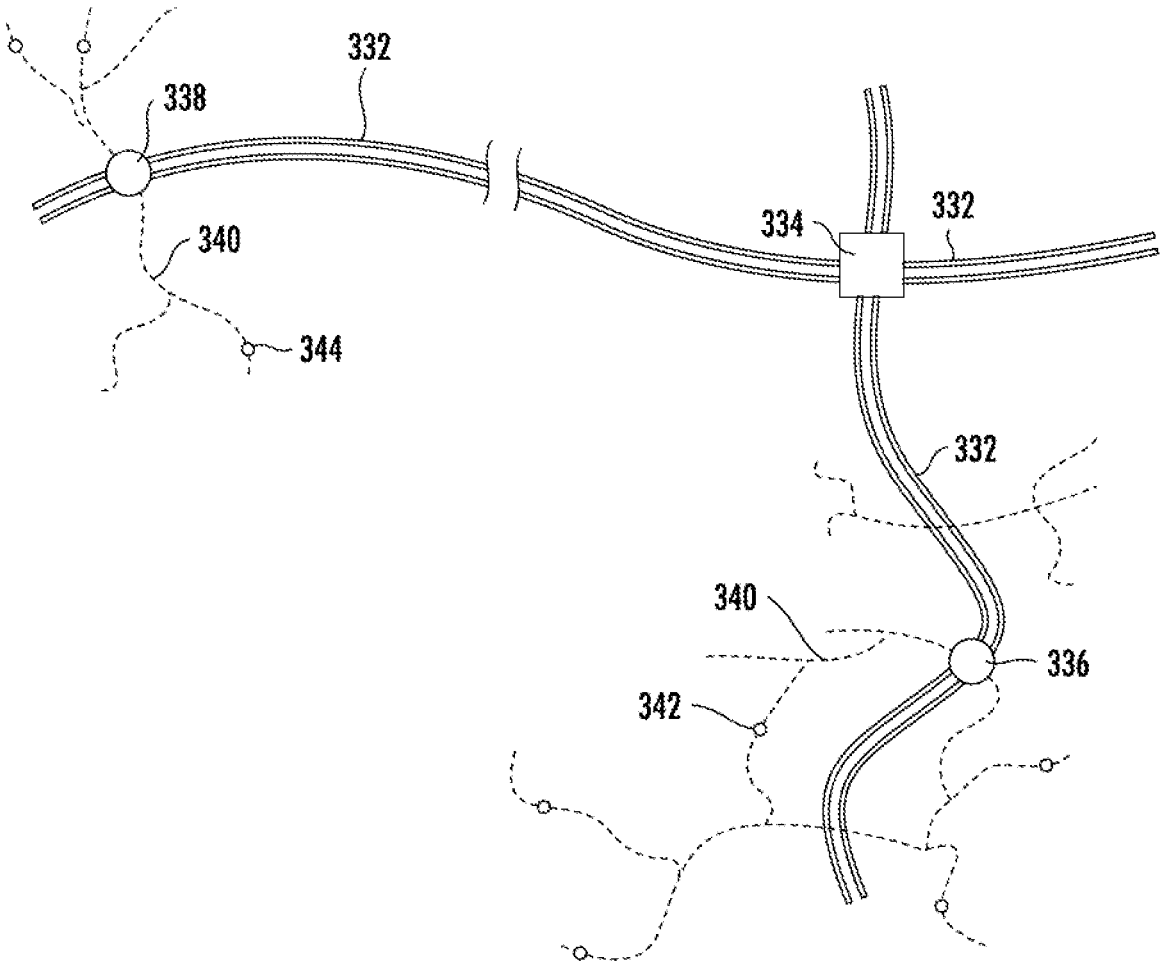

With reference to FIG. 3C, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 350, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

Autonomous platforms can understand the environment proximate to the autonomous platform through one or more sensors, such as RADAR systems. For instance, autonomous platforms can use radiofrequency signals emitted by an antenna to determine the presence of objects in the environment through analysis of data captured through the RADAR system. Many RADAR antennas emit radiation in an azimuthal profile represented by a transmit pattern. In some cases, portions of the autonomous platform may interfere with radiofrequency (RF) signals emitted by the RADAR systems, which can lead to false detection of objects in the environment.

According to example aspects of the present disclosure, an autonomous platform can include one or more RADAR systems that include antennas that emit radiation in a narrow azimuthal profile, such as a so-called "pencil band" antenna system. The transmit patterns of these systems can have energy primarily directed towards a boresight of the antenna, with less energy at the azimuthal extremes of the transmit pattern. Because these narrow-band RADAR systems emit radiation in a narrow azimuthal profile, they can be less sensitive to interference caused by energy at the azimuthal extremes interacting with portions of the autonomous platform. The narrow-band RADAR systems can be positioned to cover an angular range of the environment proximate to the autonomous platform that is sensitive to interference from energy at the azimuthal extremes. This can include, for example, the side of a trailer attached to an autonomous tractor of an autonomous truck.

Figure 4:
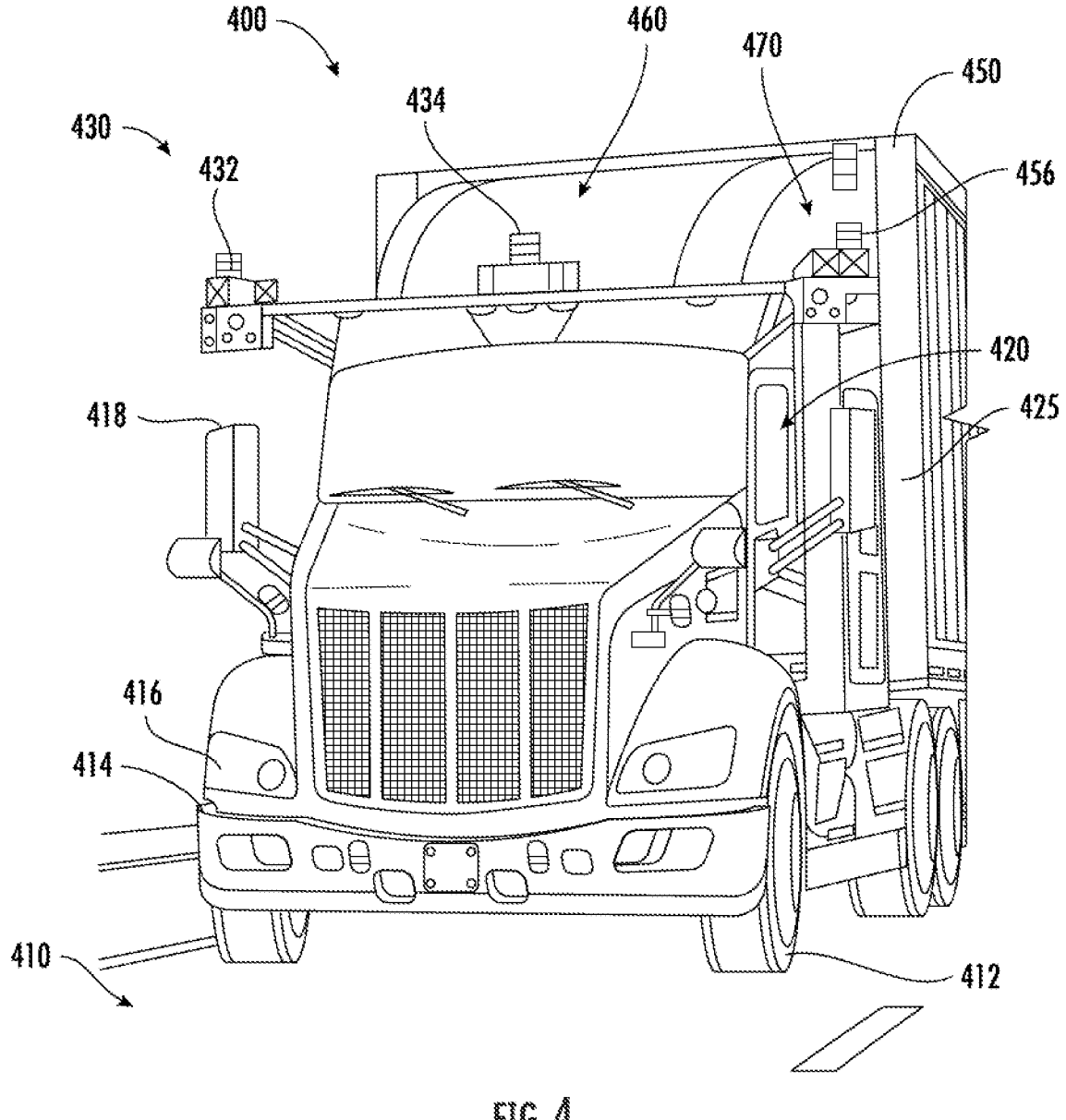
FIG. 4 is an example autonomous truck according to some implementations of the present disclosure.

FIG. 4 is an example autonomous truck 400 according to some implementations of the present disclosure. Generally, an autonomous truck can include a tractor unit (e.g., an autonomous tractor) coupled to a trailer. As used herein, an "autonomous truck" can refer to any suitable autonomous vehicle, including an autonomous tractor coupled to a trailer, an autonomous tractor not coupled to a trailer, an autonomous vehicle incorporating a trailer, an autonomous vehicle towing a trailer, and/or any other suitable autonomous vehicle.

Autonomous truck 400 can be configured to tow trailer 450. The autonomous truck 400 is one example autonomous platform that can support a first RADAR sensor 460 and a second RADAR sensor 470 as described herein. The autonomous truck 400 can navigate along road surface 410. In particular, the autonomous truck 400 can include an autonomous vehicle control system that provides for autonomous functionality such as, for example, perceiving an environment of the autonomous truck 400, determining a trajectory for autonomous truck 400 to successfully navigate the environment, and/or controlling the autonomous truck 400 to implement the trajectory. The autonomous truck 400 can include components such as wheels 412, bumper 414, headlight(s) 416, mirrors 418, and/or cabin 420.

Additionally, the autonomous truck 400 can include sensor bed 430. Sensor bed 430 can act as a platform for various sensors that provide for autonomous functionality of autonomous truck 400. For instance, sensor bed 430 can include starboard sensors 432, center sensors 434, and/or port sensors 436. Each of the starboard sensors 432, center sensors 434, and/or port sensors 436 can include one or more sensors, including RADAR sensors (e.g., first and/or second RADAR sensors, as described herein), LIDAR sensors, cameras, and/or any other suitable sensors. According to some example implementations of the present disclosure, second RADAR sensors can be disposed on edges of the sensor bed 430 such that the sensors have a suitable view of areas proximate to the trailer 450.

In the example autonomous truck 400, the first RADAR sensor 460 is disposed near center sensors 434 and the second RADAR sensor 470 is disposed near port sensors 436. However, the first RADAR sensor 460 and/or the second RADAR sensor 470 can be disposed on any suitable location of the autonomous truck 400. For instance, when the autonomous truck 400 includes a sensor bed (e.g., sensor bed 430 positioned above the cabin 420 of the autonomous truck 400), the first RADAR sensor 460 and/or the second RADAR sensor 470 can be positioned on or within the sensor bed 430. For instance, in some implementations, the first RADAR sensor 460 is positioned near a center of the sensor bed 430. Additionally and/or alternatively, the first RADAR sensor 460, or other first RADAR sensors having similar characteristics (e.g., MIMO antennas) can be positioned near edges of the sensor bed 430. Additionally and/or alternatively, the second RADAR sensor 470 can be positioned on an edge of the sensor bed 430. Second RADAR sensors 470 can be positioned on only one edge (e.g., an edge corresponding to a direction of higher speed or shoulder merging, such as near port sensors 456) or both edges. In some implementations, the second RADAR sensors 470 may be positioned on or near a rear portion of the autonomous truck, such as rear edges 425 of an autonomous truck such that the sensors 470 are proximate to the sidewalls of the trailer 450.

As used herein, a "rear" or "rear portion" of an autonomous vehicle refers to a portion of the vehicle that may be understood to be a rear of the vehicle by any suitable understanding, such as, for example, a portion of the vehicle that is generally oriented opposite to a direction of travel of the vehicle during normal operation, a portion of the vehicle including brake lights, tailpipes, a trunk, a rear windshield, reverse lights, tow hitches, etc., a portion of the vehicle opposite an orientation of seats in the vehicle, or any other suitable understanding.

Figures 5A, 5B:
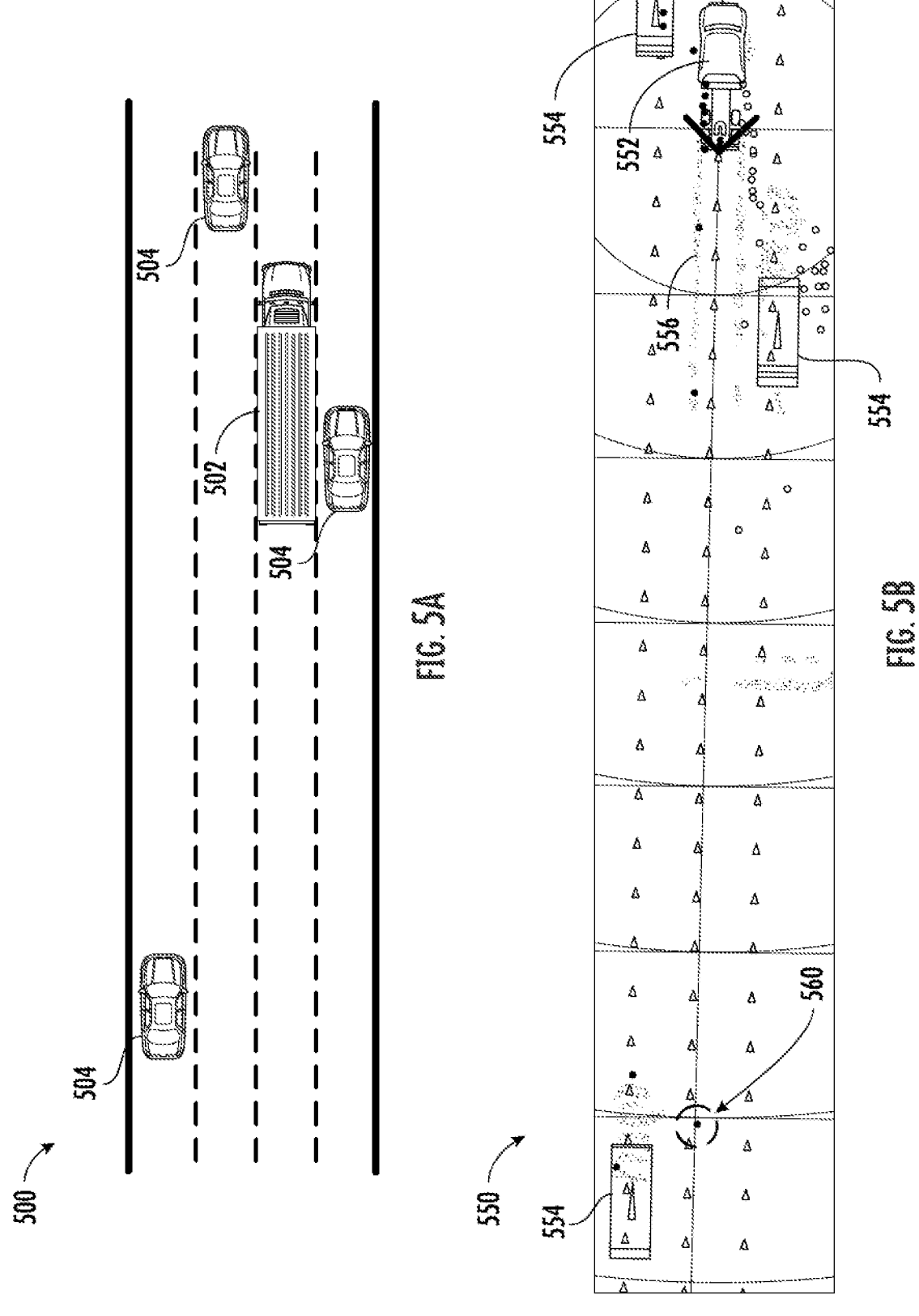
FIGS. 5A-5B are an example operating environment for an autonomous platform according to some implementations of the present disclosure.

FIGS. 5A-5B are an example operating environment for an autonomous platform according to some implementations of the present disclosure. In particular, FIG. 5A depicts an example operating environment 500 of an autonomous platform 502. FIG. 5A depicts autonomous platform 502 as an autonomous truck towing a trailer. However, it should be understood that autonomous platform 502 could be any suitable autonomous platform, such as an autonomous vehicle, a human-driven vehicle with driver assistance features (e.g., blind spot warning indicators, etc.), and/or any other suitable platform or vehicle. The operating environment 500 can additionally include one or more actors 504. As illustrated in FIG. 5A, the one or more actors 504 can include one or more vehicles, such as autonomous and/or manually driven vehicles. Other types of actors, such as pedestrians, stationary objects, traffic control markings (e.g., signage, stoplights, etc.) can also be included in operating environment 500.

FIG. 5B depicts a birds-eye-view sensor data representation 550 of operating environment 500 of FIG. 5A. For instance, sensor data representation 550 can depict how the autonomous platform 502 perceives the operating environment 500. The representation 550 can include autonomous platform 552. The autonomous platform 552, corresponding to the autonomous platform 502 of FIG. 5A, represents a point of reference in two-dimensional or three-dimensional space. For instance, RADAR systems onboard autonomous platform 552 can output a plurality of RADAR data points corresponding to detected objects in operating environment 500. For example, RADAR points 556 can correspond to a trailer of autonomous platform 552. Furthermore, a perception system can output bounding boxes 554 associated with the actors 504.

Sensor data representation 550 also includes a multipath data point 560. The multipath data point 560 is not associated with a physical actor, but rather caused by "bright" RADAR returns from sidewalls of a trailer towed by autonomous platform 552. Intuitively, the RADAR system is "blinded" to less reflective distance objects due to the trailer reflecting energy from azimuthal extremes of the RADAR beam emitted by the RADAR system. The multipath data point 560 can present challenges for object recognition, as it may be falsely recognized as an object and/or may require additional computing resources (e.g., filtering) to properly manage. According to example aspects of the present disclosure, multipath can be reduced and/or eliminated by forming a narrow field of view RADAR beam (e.g., a "pencil beam") having limited azimuthal extreme energy, such as less azimuthal extreme energy than that of a MIMO antenna.

Figures 6A, 6B:
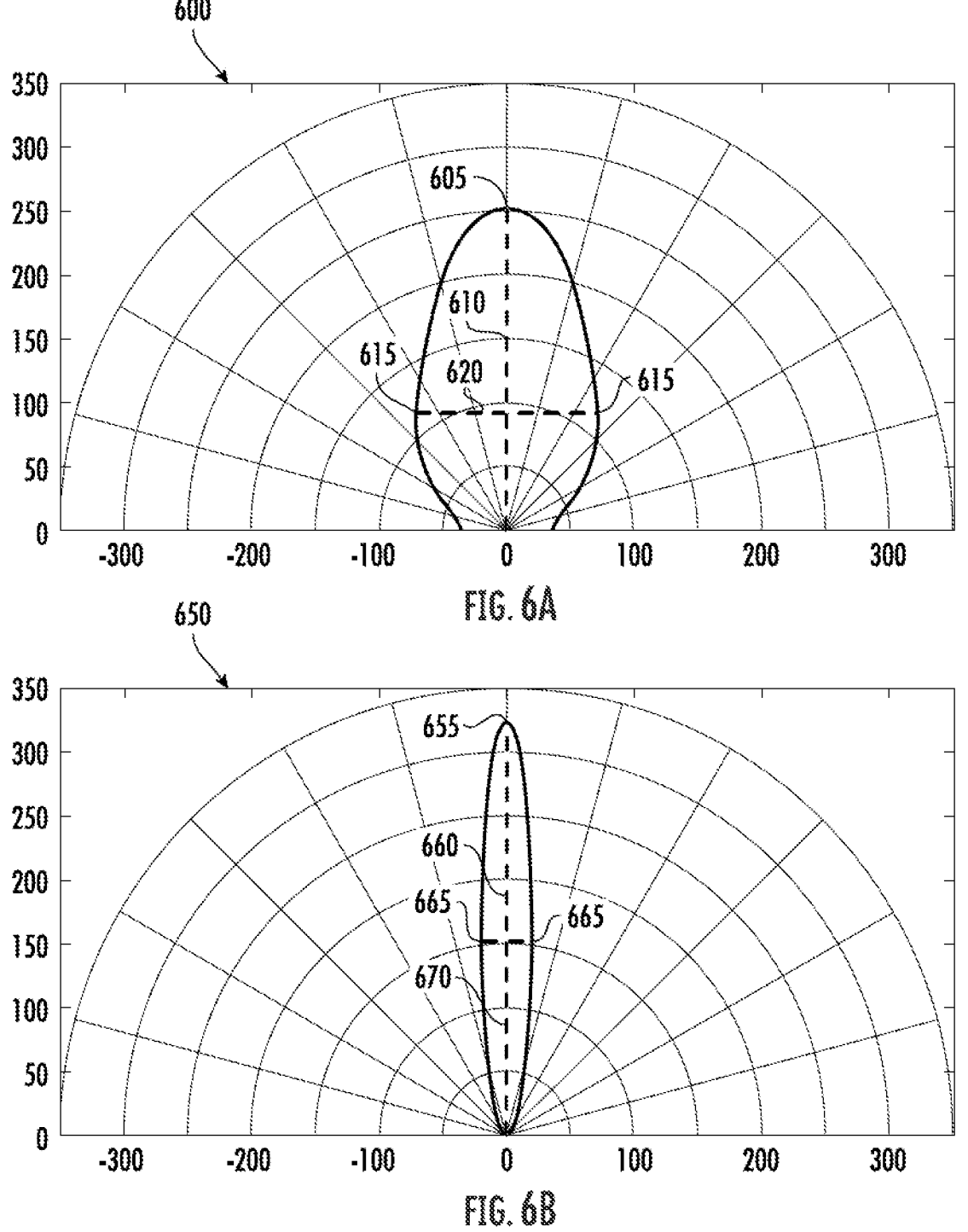
FIGS. 6A-6B are example transmit patterns for RADAR systems according to some implementations of the present disclosure.

FIGS. 6A and 6B are example transmit (and/or receive) patterns for RADAR systems according to some implementations of the present disclosure. In particular, FIG. 6A depicts a transmit pattern 600 associated with a MIMO RADAR antenna (e.g., a first antenna) according to example implementations of the present disclosure. The MIMO RADAR antenna can emit a RADAR beam that is generally represented by the transmit pattern 600. Transmit pattern 600 can include boresight lobe 605 in boresight direction 610 and/or one or more azimuthal extremes 615 along azimuthal direction 620. As used herein, an azimuthal component can refer to any suitable portion of the transmit pattern 600 along azimuthal direction 620 such as, for example, the distance between the azimuthal extremes 615, the distance between the azimuthal extremes 615 and a center (e.g., an azimuthal center) of transmit pattern 600, or other suitable component. As an example, in some embodiments, the transmit pattern 600 can include power radiated over a first (e.g., wide) azimuthal component with greater than 120 degree azimuthal span and less than 180 degree azimuthal span. The transmit pattern 600 is emitted by one example of a first antenna according to example aspects of the present disclosure.

Similarly, FIG. 6B depicts a transmit (or receive) pattern associated with a beam steering RADAR antenna (e.g., a second antenna) according to example implementations of the present disclosure. The beam steering RADAR antenna can emit a RADAR beam that is generally represented by the transmit pattern 650. Transmit pattern 650 can include boresight lobe 655 in boresight direction 660 and/or one or more azimuthal extremes 665 along azimuthal direction 670. As used herein, an azimuthal component can refer to any suitable portion of the transmit pattern 650 along azimuthal direction 670 such as, for example, the distance between the azimuthal extremes 665, the distance between the azimuthal extremes 665 and a center (e.g., an azimuthal center) of transmit pattern 650, or other suitable component. As an example, the transmit pattern 650 can include power focused in a second (e.g., narrow) azimuthal component with less than 1 degree azimuthal span and greater than 0.1 degree azimuthal span. The transmit pattern 650 is emitted by one example of a second antenna according to example aspects of the present disclosure.

According to example aspects of the present disclosure, the second RADAR beam can have a narrower azimuthal component than the first RADAR beam. Using the transmit patterns depicted in FIGS. 6A-6B as examples, FIG. 6A may depict a pattern for the first RADAR beam and FIG. 6B may depict a pattern for the second RADAR beam. As illustrated, the azimuthal component 670 of transmit pattern 650 is significantly narrower than the azimuthal component 620 of transmit pattern 600. Additionally, the transmit pattern 650 covers a greater distance in the boresight direction 660 than the transmit pattern 600 covers in its boresight direction 610. Because of this, the second antenna can detect objects at a longer range, but must be swept at a finer resolution compared to the first antenna. This can prevent the second antenna from being sufficient for some object detection applications, as the finer resolution that is required can contribute to a slower scanning speed. This, in turn, may provide an insufficient latency for object detection applications. However, the second antenna is less sensitive to multipath interference, making it desirable for angular regions that are sensitive to multipath interference.

The example patterns of FIGS. 6A and 6B are described as transmit patterns for the purposes of illustration. It should be understood that the patterns depicted in FIGS. 6A and 6B may also be referred to as "radiation patterns," "receive patterns," or similar, and, in some implementations, may be used to transmit and/or receive signals at example antennae.

Figure 7A:
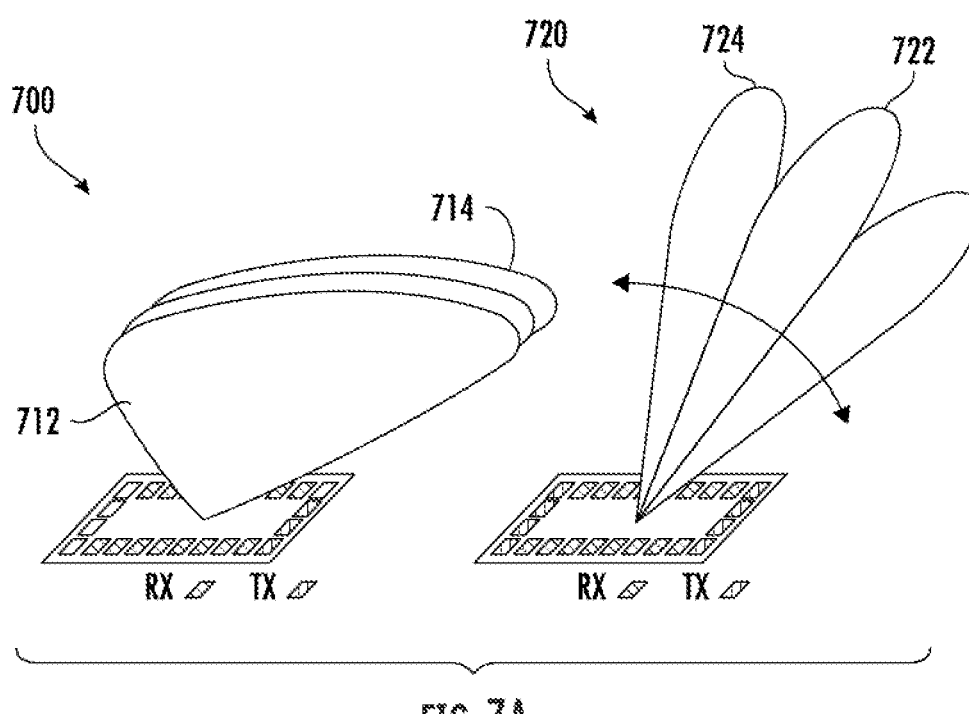
FIGS. 7A-7B are example antennas for RADAR systems illustrating beam steering according to some implementations of the present disclosure.
Figure 7B:
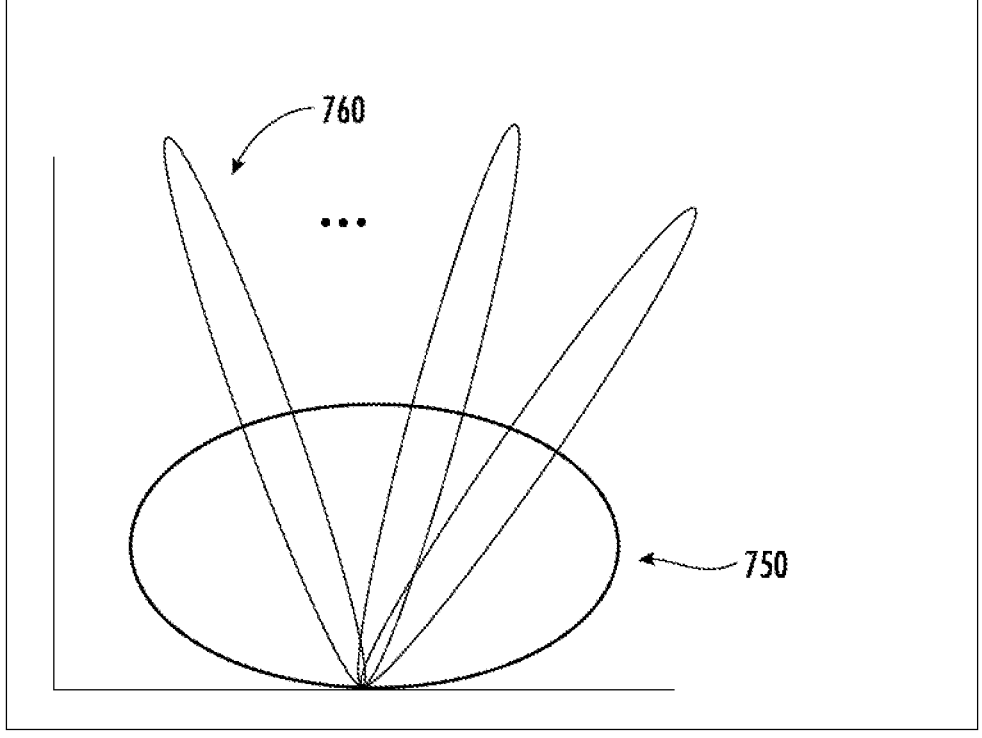

FIGS. 7A and 7B are example antennas for RADAR systems illustrating beam steering according to some implementations of the present disclosure. RADAR system 700 is a MIMO antenna configured to output a first beam having a first azimuthal component (e.g., a wide azimuthal component). As illustrated in FIG. 7A, subsequent beams from RADAR system 700 can be emitted with a same orientation relative to the antenna. For instance, a first RADAR beam 712 emitted by RADAR system 700 at a first time can have a first boresight direction. A subsequent RADAR beam 714 emitted by RADAR system 700 at a second time (e.g., at a subsequent time) can have a second boresight direction that is equal to or about equal to the first boresight direction. Additionally and/or alternatively, one or more azimuthal extremes of the first RADAR beam 712 can be equal to or about equal to one or more azimuthal extremes of the subsequent RADAR beam 714. For instance, the azimuthal extremes can have equivalent and/or about equivalent intensity and/or positioning.

FIG. 7A illustrates an example beam steering RADAR system 720 according to example implementations of the present disclosure. RADAR system 720 is a beam steering RADAR system configured to output a second beam 722 having a second azimuthal component (e.g., a narrow azimuthal component). For instance, as illustrated in FIG. 7A, the second beam 722 can have a significantly narrower azimuthal component than first beam 712, which can contribute to reduced multipath interference and/or longer detection distance, as described herein. Furthermore, as illustrated in FIG. 7A, subsequent beams from RADAR system 720 can have different orientations such that the beams are swept over an angular range. For instance, a second RADAR beam 722 emitted by RADAR system 720 at a first time can have a first boresight direction. A subsequent RADAR beam 724 emitted by RADAR system 720 at a second time (e.g., at a subsequent time) can have a second boresight direction that is equal to or about equal to the first boresight direction. Additionally and/or alternatively, one or more azimuthal extremes of the second RADAR beam 722 can be equal to or about equal to one or more azimuthal extremes of the subsequent RADAR beam 724. For instance, the azimuthal extremes can have equivalent and/or about equivalent intensity and/or positioning.

FIG. 7B illustrates a comparison of transmit patterns. First transmit pattern 750 can be emitted by a first antenna, such as a MIMO antenna. Second transmit pattern(s) 760 can be emitted by a second antenna, such as a beam steering antenna. The first transmit pattern 750 can cover a wider (e.g., greater) angular range than the second transmit pattern(s) 760. For instance, transmit pattern 750 can cover a same angular range as multiple second transmit pattern(s) 760, such as three to four second transmit pattern(s) 760, for example. However, second transmit pattern(s) 760 can have a greater gain in the boresight direction than first transmit pattern 750, providing for the second transmit pattern(s) to cover a greater boresight distance in the boresight direction.

For instance, one example aspect of the present disclosure is directed to a RADAR sensor system. The RADAR sensor system can be included in a vehicle. The vehicle can be an autonomous vehicle, such as an autonomous vehicle control system configured to control an autonomous vehicle. Additionally and/or alternatively, the vehicle can be a nonautonomous vehicle with RADAR-augmented features, such as blind spot indicators, lane change assistance, automatic braking, and/or other suitable features. In some implementations, the vehicle (e.g., autonomous vehicle) can be coupled to and/or configured to tow a trailer. For instance, in some implementations, the vehicle can be or can include an autonomous truck. As one example, in some implementations, at least a portion of the RADAR sensor system (e.g., the at least the RADAR sensor(s)) can be incorporated into a sensor bed disposed on an exterior surface of the vehicle (e.g., autonomous vehicle). The RADAR sensor system can be disposed on any suitable (e.g., exterior) surface of the vehicle. Example aspects of the present disclosure discussed herein with reference to an autonomous vehicle for the purposes of illustration can be similarly applied to any suitable manually driven vehicles where appropriate (e.g., vehicles with driver assistance features).

Figures 8A, 8B:
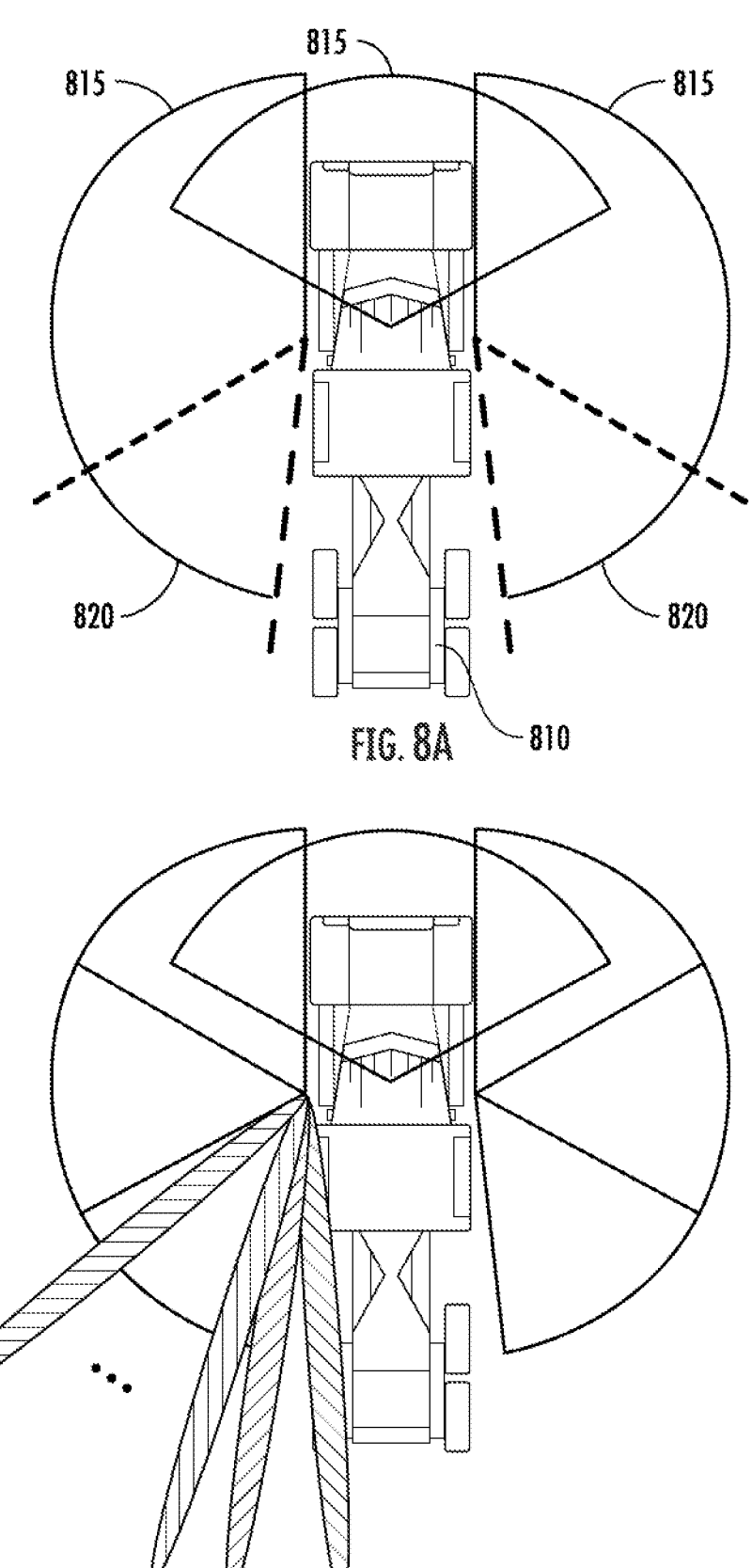
FIGS. 8A-8B are example angular ranges covered by RADAR systems in an environment of an autonomous platform according to some implementations of the present disclosure.

FIGS. 8A-8B are example angular ranges covered by RADAR systems in an environment of an autonomous platform according to some implementations of the present disclosure. In particular, FIG. 8A depicts example angular ranges covered by RADAR systems, and FIG. 8B depicts in greater detail how a second RADAR sensor can sweep a second beam over a second angular range. Autonomous platform 810 (e.g., autonomous truck) can include a first RADAR sensor including one or more first antennas (e.g., MIMO antenna(s)). The first antenna(s) can emit RADAR beams to generally cover first angular ranges 815. As illustrated, first angular ranges 815 are generally directed towards a front of the autonomous platform 810. Each of the first angular ranges may be covered by a same or separate first antenna of the first RADAR sensor. Additionally, autonomous platform 810 can include a second RADAR sensor including one or more second antennas (e.g., beam steering antenna(s)). The second antenna(s) can sweep second RADAR beams over second angular ranges 820 to obtain detections having a longer detection range and/or reduced sensitivity to multipath interference. For instance, FIG. 8B depicts one example of sweeping RADAR beams over second angular ranges 820. In particular, at a first time, a second RADAR sensor can output an initial beam 825. Initial beam 825 can have a first direction and radiation characteristics that correspond to a first transmit pattern. With the second RADAR sensor outputting initial beam 825, the second RADAR sensor can obtain RADAR data indicative of detections in a boresight direction of initial beam 825.

At a second time, the second RADAR sensor can output a first subsequent beam 830. The first subsequent beam 830 can have a second direction that is different from the first direction. However, other characteristics of the first subsequent beam 830, such as azimuthal component and/or boresight component, can be identical or substantially similar to initial beam 825. For instance, the initial beam 825 can be rotated or steered to form the first subsequent beam 830.

An angular offset between boresight direction of initial beam 825 and first subsequent beam 830 can be based on a resolution of the second RADAR sensor. For instance, a greater resolution can correspond to a smaller distance between boresight directions of initial beam 825 and first subsequent beam 830. With the second RADAR sensor outputting first subsequent beam 830, the second RADAR sensor can obtain RADAR data indicative of detections in a boresight direction of first subsequent beam 830. Similarly, first subsequent beam 830 can be rotated (e.g., by the same amount) to form second subsequent beam 835. This process can be repeated until final beam 850. Once the second RADAR sensor has obtained RADAR data indicative of directions in a boresight direction of final beam 850, the sensor has completed one sweep of the angular range 820. In some implementations, the second RADAR sensor can continuously sweep the angular range 820. For instance, in some implementations, the second RADAR sensor can sweep the angular range 820 in the same direction for each pass. In alternative implementations, the second RADAR sensor can sweep the angular range 820 in a first direction (e.g., clockwise) for a first pass and sweep the angular range 820 in a second direction (e.g., counterclockwise) for a second pass.

Figures 9A, 9B:
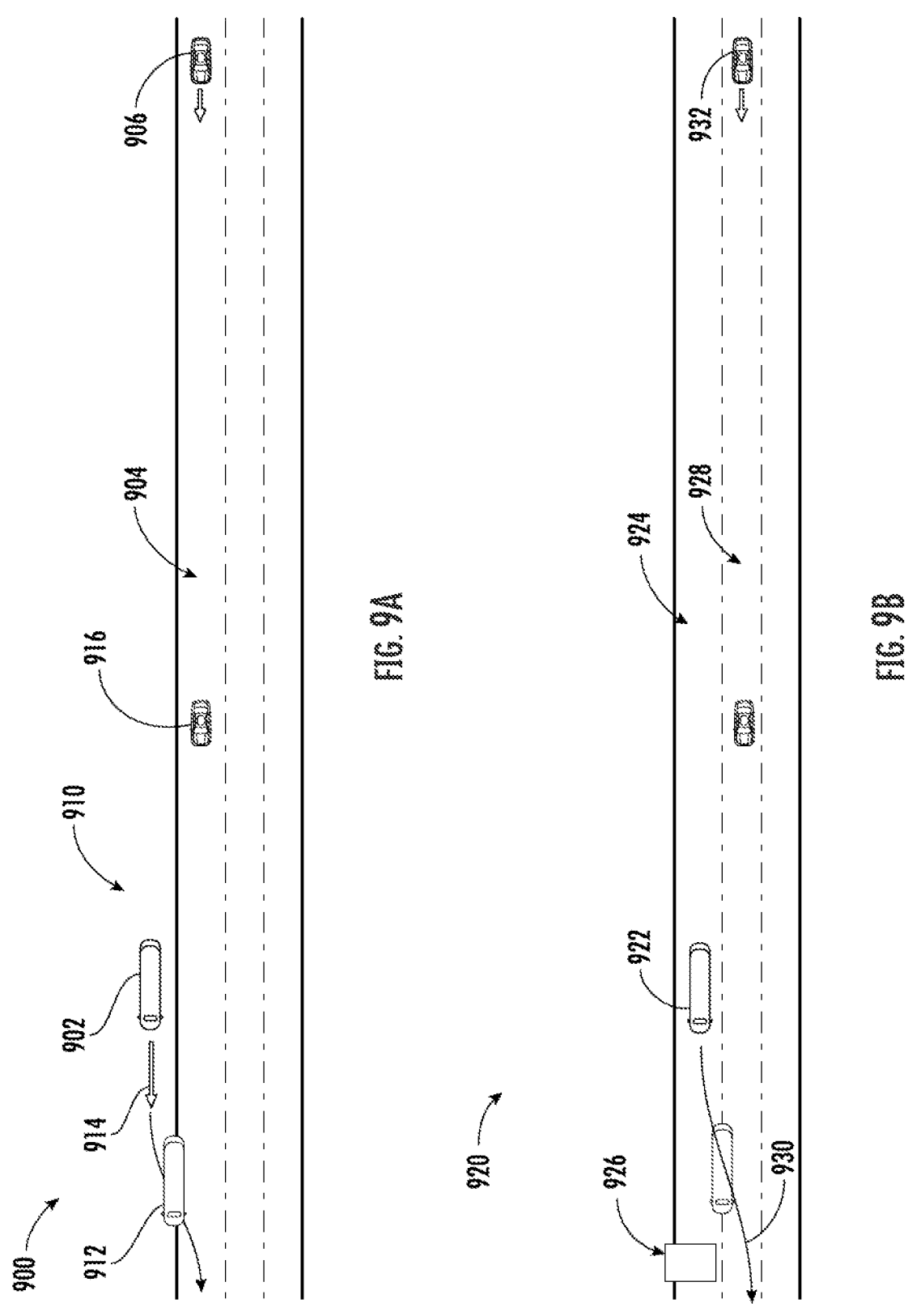
FIGS. 9A-9D are example uses cases for applications of autonomous vehicle control systems according to some implementations of the present disclosure.

FIGS. 9A, 9B, 9C, and 9D are example uses cases for applications of autonomous vehicle control systems according to some implementations of the present disclosure. For instance, FIG. 9A depicts an example return from shoulder scenario 900. Autonomous platform 902 may execute a pull to shoulder maneuver for any of various reasons, such as, for example, to clear the way for emergency vehicles, to manage an atypical operational status, to prevent merging into oncoming traffic, or any other suitable reason, such that the autonomous platform 902 exits a driving lane 904 to pull onto shoulder 910.

After performing the pull to shoulder maneuver, the autonomous platform 902 should be able to return to the driving lane 904 and resume driving. However, the autonomous platform 902 can plan its motion to avoid oncoming traffic, such as vehicle 906, that may occupy driving lane 904. Challenges are associated with returning to driving lane 904 with the autonomous platform. For instance, if the autonomous platform 902 is towing a heavy load that limits its acceleration, it can be difficult for the autonomous platform 902 to quickly return to a particular speed for driving lane 904.

Using the technology of the present disclosure, the autonomous platform 902 can have a long detection range along driving lane 904, such that it is ensured to have sufficient area to merge. For instance, the autonomous platform 902 can detect vehicle 906 at a distance such that, by the time autonomous platform 902 has completed a return from shoulder trajectory 914 and moved to position 912, the vehicle 906 can be expected to be at position 916, which gives autonomous platform 902 enough room to return to an acceptable speed. In this way, example aspects of the present disclosure provide for an increased detection distance and/or reduced likelihood of multipath interference, which can improve the performance of RADAR systems in scenarios including the return from shoulder scenario 900. The use of a second RADAR sensor employing a narrower-band antenna (e.g., a pencil-band antenna) while a first RADAR sensor covers a larger angular range of the autonomous platform 902 can provide for the autonomous platform 902 to detect vehicles with greater distance along the driving lane 904, providing improved understanding of the environment of the autonomous platform 902 and improved decision making by motion planning systems, without sacrificing the capability of the autonomous platform 902 to detect objects in regions other than the driving lane 904 (e.g., regions covered by the first RADAR sensor).

FIG. 9B depicts an example obstructed lane scenario 920. In the obstructed lane scenario 920, an object 926, such as a disabled or stopped vehicle, debris, road damage, or other suitable object prevents autonomous platform 922 from traveling along lane 924. To avoid the stopped object, the autonomous platform 922 can execute a lane change maneuver 930 to transition into adjacent lane 928. However, if the autonomous platform 922 is unable to complete the lane change maneuver 930 quickly enough, the autonomous platform 922 may reduce its speed to avoid the object 926. Thus, in some cases, autonomous platform 922 may then plan its motion to return to a particular speed from a reduced speed or even a standstill while merging into adjacent lane 928. It can thus be beneficial for autonomous platform 922 to have a detection range into adjacent lane 928 that is sufficient to ensure that the autonomous platform 922 has sufficient area to return to adjacent speed and avoid oncoming traffic, such as vehicle 932. Example aspects of the present disclosure provide for an increased detection distance and/or reduced likelihood of multipath interference, which can improve the performance of RADAR systems in scenarios including the obstructed lane scenario 920. The use of a second RADAR sensor employing a narrower-band antenna (e.g., a pencil-band antenna) while a first RADAR sensor covers a larger angular range of the autonomous platform 922 can provide for the autonomous platform 922 to detect vehicles (e.g., 932) with greater distance along the adjacent lane 928, providing improved understanding of the environment of the autonomous platform 922 and improved decision making by motion planning systems, without sacrificing the capability of the autonomous platform 922 to detect objects in regions other than the adjacent lane 928 (e.g., regions covered by the first RADAR sensor).

Figures 9C, 9D:
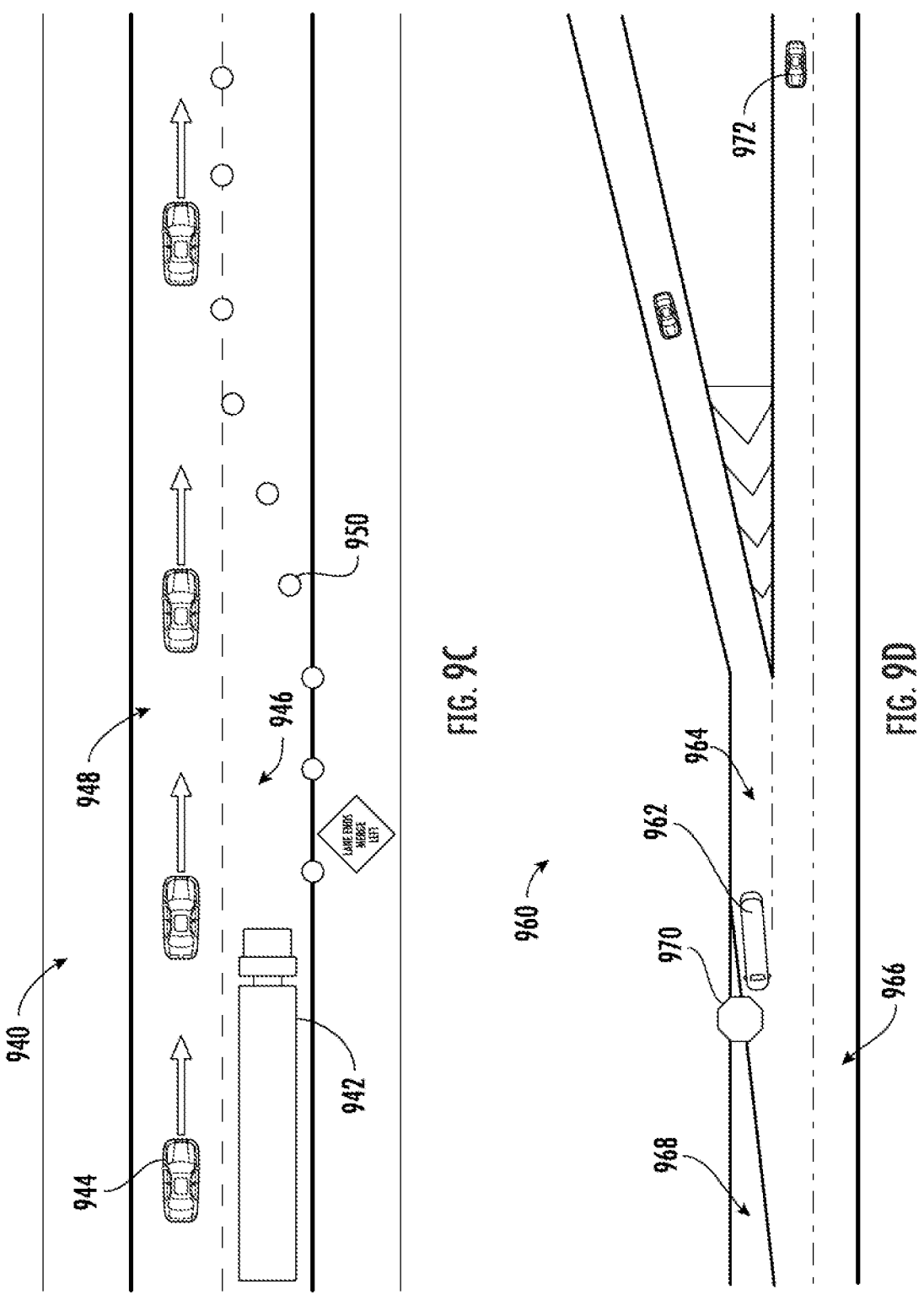

FIG. 9C depicts an example lane closure scenario 940. For instance, lane 946 may be closed due to construction or other suitable reason. Traffic control items 950, such as cones, barrels, signage, etc. can instruct vehicles from closed lane 946 to merge into adjacent lane 948. The autonomous platform 942 can execute a lane change maneuver to transition into adjacent lane 948. However, if the autonomous platform 942 is unable to complete the lane change maneuver quickly enough, the autonomous platform 942 can reduce its speed to avoid traffic control items 950. Thus, in some cases, the autonomous platform 942 may then return to a particular speed from a reduced speed or even a standstill while merging into adjacent lane 948. It can thus be beneficial for autonomous platform 942 to have a detection range into adjacent lane 948 that is sufficient to ensure that the autonomous platform 942 can return to adjacent lane 948 with enough speed and avoid oncoming traffic 944. It can be especially desirable in lane closure scenario 940 to provide accurate detections, due to the increased likelihood of debris, road damage, pedestrians (e.g., workers, emergency services, etc.), and other high-interest objects. Example aspects of the present disclosure provide for an increased detection distance and/or reduced likelihood of multipath interference, which can improve the performance of RADAR systems in scenarios including the lane closure scenario 940. The use of a second RADAR sensor employing a narrower-band antenna (e.g., a pencil-band antenna) while a first RADAR sensor covers a larger angular range of the autonomous platform 942 can provide for the autonomous platform 942 to detect vehicles (e.g., 944) with greater distance along the adjacent lane 948, providing improved understanding of the environment of the autonomous platform 942 and improved decision making by motion planning systems, without sacrificing the capability of the autonomous platform 942 to detect objects in regions other than the adjacent lane 948 (e.g., regions covered by the first RADAR sensor).

FIG. 9D depicts an example merge scenario 960. Autonomous platform 962 can desirably merge from access lane 964 into driving lane 966 without entering shoulder 968. However, stop sign 970 may indicate that the autonomous platform 962 should desirably to a complete standstill before merging into driving lane 966. Thus, autonomous platform 962 can accelerate to a particular speed from a standstill while merging into driving lane 966. If autonomous platform 962 has limited acceleration due to, for example, a heavy load, the autonomous platform 962 consequently desires a large detection range in the direction of driving lane 966 to avoid collisions with oncoming traffic, such as vehicle 972. Example aspects of the present disclosure provide for an increased detection distance and/or reduced likelihood of multipath interference, which can improve the performance of RADAR systems in scenarios including the merge scenario 960. The use of a second RADAR sensor employing a narrower-band antenna (e.g., a pencil-band antenna) while a first RADAR sensor covers a larger angular range of the autonomous platform 962 can provide for the autonomous platform 962 to detect vehicles (e.g., 972) with greater distance along the driving lane 966, providing improved understanding of the environment of the autonomous platform 962 and improved decision making by motion planning systems, without sacrificing the capability of the autonomous platform 962 to detect objects in regions other than the driving lane 966 (e.g., regions covered by the first RADAR sensor).

FIG. 10 is a flowchart of a method 1000 according to some implementations of the present disclosure. One or more portions of the method 1000 can be implemented by one or more devices (e.g., one or more computing devices) or systems including, for example, the computing system 180 shown in FIG. 1, the autonomy system(s) 200 shown in FIG. 2, the computing ecosystem 10 of FIG. 11, and/or any other suitable systems or devices. Moreover, one or more portions of the method 1000 can be implemented as an algorithm on the hardware components of the devices described herein. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 1000 includes, at 1010, obtaining first RADAR data including one or more first data points associated with a first angular range of an environment of an autonomous vehicle from a first RADAR sensor. The first RADAR sensor can include a first antenna configured to output a first RADAR beam having a first (e.g., wide) azimuthal component. For instance, in some implementations, the first antenna can be a MIMO antenna. The MIMO antenna can be configured to output a RADAR beam having a generally wider azimuthal component than, for example, a beam steering antenna. The MIMO antenna can include a plurality of MIMO transceivers (e.g., transmitters and/or receivers) that collectively operate to receive and/or transmit RADAR signals through an antenna array. Each transceiver may be disposed on or within a separate integrated circuit (IC) and/or multiple transceivers may be disposed on a same IC. Multiple transceivers may be disposed on separate or same modules, boards, cards, housings, or other units.

For instance, a RADAR sensor system can include a first RADAR sensor configured to provide first RADAR data descriptive of an environment of a vehicle. The first RADAR sensor can include a first antenna configured to output a first RADAR beam having a first azimuthal component. The first RADAR sensor can emit the first RADAR beam according to a first transmit pattern including the first azimuthal component and a first boresight component. For instance, the first transmit pattern can be a two-dimensional and/or three-dimensional representation of the energy emitted in the first RADAR beam. The first transmit pattern can include one or more lobes, such as a boresight lobe and/or one or more azimuthal extremes, that mark extrema of the transmit pattern. The first azimuthal component can be based on the one or more azimuthal extremes, such as by an azimuthal distance between one of the azimuthal extremes and a center of the transmit pattern, between two azimuthal extremes, or by other reference to the azimuthal extreme(s). The first azimuthal component can be a wide azimuthal component that is or can be greater than about 30 percent of the first boresight component. For instance, an energy intensity at the azimuthal extreme can be greater than about 30 percent of a boresight energy intensity at the boresight lobe and/or less than about 100 percent of the boresight energy intensity. For example, if the boresight component has a maximum intensity of 100 dBi (e.g., with a boresight lobe at 100 dBi), the azimuthal component may be greater than about 30 dBi (e.g., with azimuthal extreme(s) at 30 or more dBi). As an example, the first transmit pattern can include power radiated over a first (e.g., wide) azimuthal component with greater than 120 degree azimuthal span and less than 180 degree azimuthal span. It should be understood that a transmit pattern is a nontransient representation of energy emitted by an antenna, so actual RADAR beams emitted by the antenna may not exactly match the transmit pattern at all times, but will generally behave according to the transmit pattern.

For instance, in some implementations, the first antenna can be a MIMO antenna. The MIMO antenna can be configured to output a RADAR beam having a generally wider azimuthal component than, for example, a beam steering antenna. The MIMO antenna can include a plurality of MIMO transceivers (e.g., transmitters and/or receivers) that collectively operate to receive and/or transmit RADAR signals through an antenna array. Each transceiver may be disposed on or within a separate integrated circuit (IC) and/or multiple transceivers may be disposed on a same IC. Multiple transceivers may be disposed on separate or same modules, boards, cards, housings, or other units. As used herein, transceivers can refer to devices capable of both transmit and receive functions in addition to and/or alternatively to devices capable of only one of transmit or receive functions, unless indicated otherwise.

The first RADAR antenna can be configured to output the first RADAR beam over a first angular range. The first angular range can be configured to cover a front portion of the vehicle, such as a front of the vehicle. As used herein, a "front" or "front portion" of an autonomous vehicle refers to a portion of the vehicle that may be understood to be a front of the vehicle by any suitable understanding, such as, for example, a portion of the vehicle that is generally oriented toward a direction of travel of the vehicle during normal operation, a portion of the vehicle including an engine block, windshield, grill, bumper, headlights, etc., a portion of the vehicle towards which seats in the vehicle face, or any other suitable understanding. Additionally and/or alternatively, in some implementations, the first angular range can cover a majority of the vehicle (e.g., at least 180 degrees surrounding the vehicle). As used herein, a RADAR sensor can cover an angular range if the sensor is configured to transmit and/or receive RADAR signals within the angular range. For instance, the MIMO antenna of the first RADAR sensor can generally cover a wider angular range while still providing desirable frequency and resolution within the wider range.

The method 1000 includes, at 1020, obtaining second RADAR data including one or more second data points associated with a second angular range of the environment of the autonomous vehicle from a second RADAR sensor. The second RADAR sensor can include a second antenna configured to output a second RADAR beam having a second (e.g., narrow) azimuthal component that is narrower than the first (e.g., wide) azimuthal component of the first RADAR beam. For example, the second antenna can be a beam steering antenna emitting a beam according to a transmit pattern having a second azimuthal component. The second azimuthal component can be narrower than a first azimuthal component of the first RADAR sensor such that the second RADAR beam is less affected by multipath interference from components of an autonomous vehicle, such as sidewalls of a trailer. For instance, in some implementations, the second azimuthal component can be a narrow azimuthal component that is or can be less than about 30 percent of the second boresight component and/or greater than about 1 percent of the second boresight component. For instance, in some implementations, the second azimuthal component can be a narrow azimuthal component that is or can be greater than about 50 percent of the second boresight component. As an example, a transmit pattern of the second antenna can include power focused in a narrow azimuthal component with less than 1 degree azimuthal span and greater than 0.1 degree azimuthal span.

The autonomous vehicle can further include a second RADAR sensor using a wider-band antenna, such as a multiple-input-multiple-output (MIMO) antenna. The second RADAR sensor can cover other (e.g., larger) angular ranges of the environment proximate to the autonomous platform. For instance, the narrow profile of the narrow-band RADAR system can be swept over a smaller angular range (e.g., towards the rear of an autonomous vehicle) while the additional RADAR system uses a wider-band antenna to capture information over the remaining angular range. In this way, the RADAR systems can provide improved detection of objects in the environment having less interference from components of the autonomous platform. Furthermore, in some implementations, an additional RADAR system using a wider-band antenna, such as a multiple-input-multiple-output (MIMO) antenna, can cover other (e.g., larger) angular ranges of the environment proximate to the autonomous platform. For instance, the narrow profile of the narrow-band RADAR system can be swept over a smaller angular range (e.g., towards the rear of an autonomous vehicle) while the additional RADAR system uses a wider-band antenna to capture information over the remaining angular range. In this way, the RADAR systems can provide improved detection of objects in the environment having less interference from components of the autonomous platform.

As used herein, "sweeping" a RADAR beam over an angular range refers to any process, method, or operation by which RADAR data is captured over the angular range in segmented portions. For instance, a RADAR sensor capable of generating RADAR data over a certain range less than the angular range to be swept may be positioned at a first direction or orientation such that the RADAR sensor captures RADAR data in the first direction. The RADAR sensor may then be reoriented, by rotation, movement, electrical recalibration, or otherwise, such that the RADAR sensor is positioned at a second direction or orientation. The RADAR sensor may then capture RADAR data in the second direction. This process can be repeated until the RADAR sensor has observed the entire angular range to be swept over. The RADAR system may continually scan the angular range, such as by repeating the sweep from the beginning once the sweep has completed.

The second antenna can be configured to output a second RADAR beam having a second azimuthal component that is narrower than the first azimuthal component of the first RADAR beam. For instance, the second RADAR sensor can emit the second RADAR beam according to a second transmit pattern including the second azimuthal component and a second boresight component. For instance, the second transmit pattern can be a two-dimensional and/or three-dimensional representation of the energy emitted in the second RADAR beam. The second transmit pattern can include one or more lobes, such as a boresight lobe and/or one or more azimuthal extremes, that mark extrema of the transmit pattern. The second azimuthal component can be based on the one or more azimuthal extremes, such as by an azimuthal distance between one of the azimuthal extremes and a center of the transmit pattern, between two azimuthal extremes, or by other reference to the azimuthal extreme(s).

According to example aspects of the present disclosure, the second azimuthal component can be narrower than the first azimuthal component, such that the second RADAR beam is less affected by multipath interference from components of an autonomous vehicle, such as sidewalls of a trailer. For instance, in some implementations, the second azimuthal component can be a narrow azimuthal component that is or can be less than about 30 percent of the second boresight component and/or greater than about 1 percent of the second boresight component. For instance, an energy intensity at the azimuthal extreme can be less than about 30 percent of a boresight energy intensity at the boresight lobe and/or greater than about 1 percent of the boresight energy intensity. For example, if the boresight component has a maximum intensity of 100 dBi (e.g., with a boresight lobe at 100 dBi), the azimuthal component may be less than about 30 dBi (e.g., with azimuthal extreme(s) at 30 or fewer dBi). Furthermore, as another example, if the first RADAR antenna is a MIMO antenna emitting a first RADAR beam having a azimuthal extreme intensity of about 40 dBi, the second RADAR antenna can be a beam steering antenna configured to form a "pencil beam" having a azimuthal extreme intensity of about 10 dBi.

Although the use of a beam steering antenna can provide for high detection range and reduced multipath interference, the angular range covered by each emitted beam can be limited. For instance, some beam steering antennas may only provide reliable detections at each emitted beam with a resolution that is a fraction of a degree. Thus, covering broad angular ranges with a narrow beam steering antenna can present latency challenges associated with sweeping the beam over the broad angular range.

The first RADAR sensor and/or the second RADAR system can be included in and/or otherwise coupled to an autonomous vehicle control system. The autonomous vehicle control system can be configured to control the autonomous vehicle (and/or other types of autonomous platform(s)). For instance, the autonomous vehicle control system can include one or more processors and one or more non-transitory, computer-readable media storing instructions that are executable to cause the one or more processors to perform operations for implementing the methods, processes, and other steps described herein.

Additionally, the second RADAR sensor can be configured to sweep the second RADAR beam over a second angular range to obtain the second RADAR data. The second angular range can be closer to a rear of the autonomous vehicle than a front of the vehicle. As an example, if a front of the vehicle is used as a zero-degree point of reference, the second angular range may include angular values not exceeding 90 degrees to about 270 degrees. For instance, the second antenna can be directed to a trailer coupled to the vehicle and/or proximate to the trailer coupled to the vehicle. For instance, the second antenna can be or can include a beam steering antenna that is directed to a trailer coupled to the vehicle. For instance, the second angular range can be configured to be proximate to (e.g., bordering) a trailer coupled to the vehicle. The second angular range can be a limited range, such as a range having a maximum span of about 30 degrees and/or a minimum span of about 1 degree.

In some implementations, obtaining the second RADAR data can include sweeping the second RADAR beam over a second angular range. For instance, the second RADAR sensor can be configured to sweep the second RADAR beam over the second angular range which is closer to a rear of the autonomous vehicle than a front of the autonomous vehicle to obtain the second RADAR data. In some implementations, sweeping the second RADAR beam over the second angular range can include broadcasting the second RADAR beam in a first angular direction of the second angular range. For instance, the second RADAR beam can be emitted with the boresight direction of the second RADAR beam directed in the first angular direction. The first angular direction can fall within and/or border the second angular range. The second RADAR sensor can then obtain a first portion of the second RADAR data associated with the first angular direction with the second RADAR beam broadcasted in the first angular direction. For instance, the first portion of the second RADAR data can include detections of objects in the first angular direction and/or closely bordering the first angular direction. The second RADAR sensor can then broadcast the second RADAR beam in a second angular direction of the second angular range. For instance, the second RADAR beam can be shifted or rotated such that the boresight direction is aligned with the second angular direction. The second RADAR sensor can then obtain a second portion of the second RADAR data associated with the second angular direction with the second RADAR beam broadcasted in the second angular direction. For instance, the second portion of the second RADAR data can include detections of objects in the second angular direction and/or closely bordering the second angular direction. This process can be repeated over several iterations until the entire second angular range is covered, with a desired resolution, and/or restarted once each sweep of the second angular range is complete.

The method 1000 includes, at 1030, detecting one or more objects in the environment of the autonomous vehicle based on the first RADAR data and the second RADAR data. For instance, detecting one or more objects in the environment of the autonomous vehicle based on the first RADAR data and the second RADAR data can include providing the first RADAR data and the second RADAR data to a perception system of the autonomous vehicle. In some implementations, providing the first RADAR data and the second RADAR data to a perception system can include providing the first RADAR data and the second RADAR data to a sensor data fusion module configured to fuse at least the first RADAR data and the second RADAR data to generate fused RADAR data including a point-cloud representation of the environment of the autonomous vehicle.

Additionally and/or alternatively, the method 1000 can include, at 1040, determining, based on the one or more objects in the environment of the autonomous platform, a motion trajectory for navigating the autonomous platform. For instance, the objects detected by the perception system can be provided to a planning system configured to output the motion trajectory to navigate through the environment of the autonomous platform with respect to objects, traffic regulations, and other road considerations.

The method 1000 can include, at 1050, controlling the autonomous platform based on the motion trajectory to navigate the autonomous platform through the environment. For instance, control systems onboard the autonomous platform, such as steering systems, braking systems, indicator systems, lights, or other control system can be operated in accordance with the motion trajectory to control the autonomous platform and execute the motion trajectory. The autonomous platform can thus be navigated through its environment.

Figure 11:
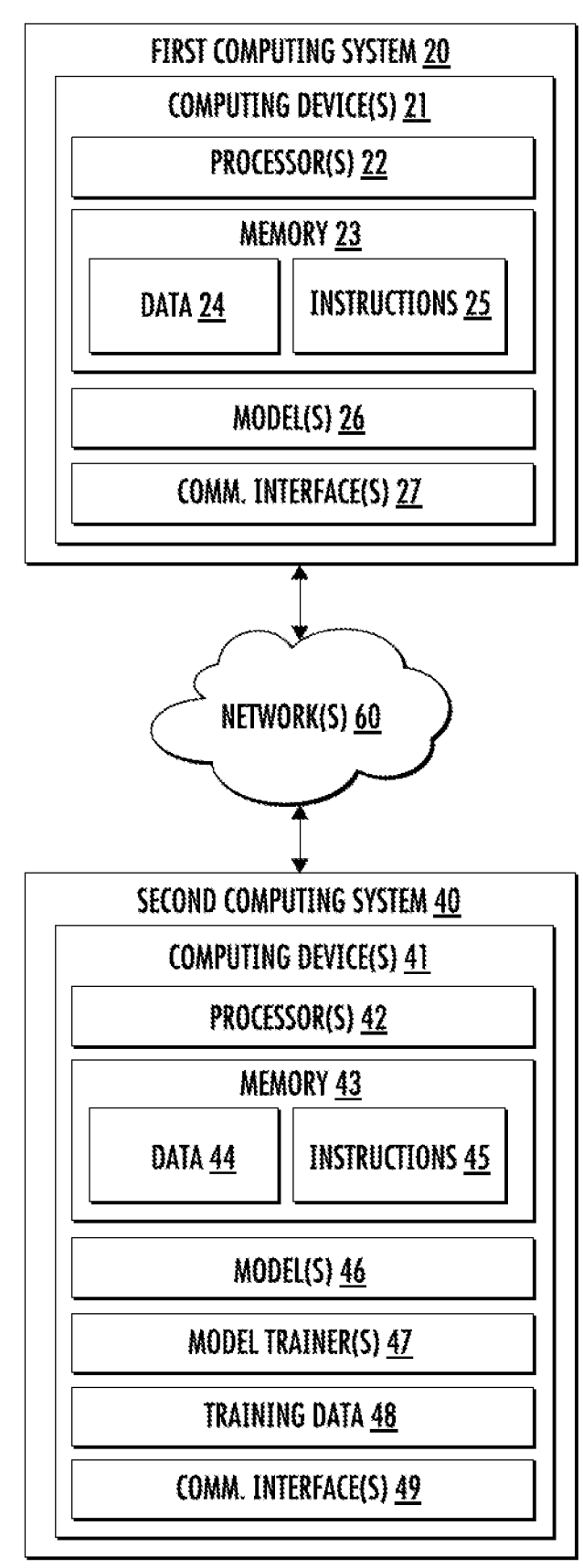
FIG. 11 is a block diagram of an example computing system according to some implementations of the present disclosure.

FIG. 11 is a block diagram of an example computing ecosystem 10 according to some implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, down-loaded, etc.). The data 24 can include, for instance, sensor data (e.g., RADAR data), map data, data associated with autonomy functions (e.g., data associated with the percep-tion, planning, or control functions), simulation data, or any data or information described herein. As one example, the data 24 can include first RADAR data obtained from a first RADAR sensor including a first antenna configured to output a first RADAR beam having a first azimuthal com-ponent over a first angular range. Additionally and/or alter-natively, the data 24 can include second RADAR data obtained from a second RADAR sensor including a second antenna configured to output a second RADAR beam having a second azimuthal component that is narrower than the first azimuthal component of the first RADAR beam. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. In some implementations, the models 26 can be or can otherwise include one or more machine-learned models. As examples, the models 26 can be or can otherwise include various machine-learned models such as, for example, regression networks, generative adversarial networks, neural networks (e.g., deep neural networks), support vector machines, deci-sion trees, ensemble models, k-nearest neighbors models, Bayesian networks, or other types of models including linear models or non-linear models. Example neural networks include feed-forward neural networks, recurrent neural net-works (e.g., long short-term memory recurrent neural net-works), convolutional neural networks, or other forms of neural networks. For example, the first computing system 20 can include one or more models for implementing subsys-tems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environ-ment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simula-tion data, simulated environmental scenes, simulated sensor data, data associated with vehicle trips/services, or any data or information described herein. As one example, the data 44 can include first RADAR data obtained from a first RADAR sensor including a first antenna configured to output a first RADAR beam having a first azimuthal component over a first angular range. Additionally and/or alternatively, the data 44 can include second RADAR data obtained from a second RADAR sensor including a second antenna config-ured to output a second RADAR beam having a second azimuthal component that is narrower than the first azi-muthal component of the first RADAR beam. In some implementations, the second computing system 40 can obtain data from one or more memory device(s) that are remote from the second computing system 40.

The memory 43 can also store computer-readable instruc-tions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

In addition, or alternatively to, the model(s) 26 at the first computing system 20, the second computing system 40 can include one or more models 46. As examples, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 11 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. In addition, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A method for detecting objects in an environment of a vehicle, the method comprising:
   (i) obtaining first RADAR data comprising one or more first data points associated with a first angular range of the environment of the vehicle from a first RADAR sensor;
   (ii) obtaining second RADAR data comprising one or more second data points associated with a second angular range of the environment of the vehicle from a second RADAR sensor, wherein the second angular range is closer to a rear of the vehicle than a front of the vehicle, and wherein a second azimuthal profile of the second RADAR sensor is narrower than a first azimuthal profile of the first RADAR sensor; and
   (iii) detecting one or more objects in the environment of the vehicle based on the first RADAR data and the second RADAR data.

2. The method of claim 1, wherein the first RADAR sensor comprises a first antenna that includes a multiple-input multiple-output (MIMO) antenna.

3. The method of claim 1, wherein the second RADAR sensor comprises a second antenna that includes a beam steering antenna that is directed to a trailer coupled to the vehicle.

4. The method of claim 1, wherein the first angular range is configured to cover the front of the vehicle.

5. The method of claim 1, wherein the second angular range is configured to be proximate to at least one sidewall of a trailer coupled to the vehicle.

6. The method of claim 1, wherein a transmit pattern of a second antenna of the second RADAR sensor comprises power focused in a smaller azimuthal component than a transmit pattern of a first antenna of the first RADAR sensor.

7. The method of claim 6, wherein the transmit pattern of the second antenna comprises power focused in a second azimuthal component with less than 1 degree azimuthal span and greater than 0.1 degree azimuthal span.

8. The method of claim 6, wherein a transmit pattern of the first antenna comprises power radiated over a first azimuthal component with greater than 120 degree azimuthal span and less than 180 degree azimuthal span.

9. The method of claim 1, wherein a transmit pattern of a second antenna of the second RADAR sensor has a primary energy component directed towards a boresight of the second antenna and secondary energy components at azimuthal extremes of the transmit pattern of the second antenna.

10. The method of claim 9, wherein the second energy components have less energy than the primary energy component.

11. The method of claim 1, wherein the second angular range comprises less than thirty degrees and greater than zero degrees.

12. A radio detection and ranging (RADAR) sensor system for a vehicle, the RADAR sensor system comprising:
   (a) a first RADAR sensor configured to generate first RADAR data comprising one or more first data points associated with a first angular range of an environment of the vehicle; and
   (b) a second RADAR sensor configured to generate second RADAR data comprising one or more second data points associated with a second angular range of the environment of the vehicle, wherein the second angular range is closer to a rear of the vehicle than a front of the vehicle, and wherein a second azimuthal profile of the second RADAR sensor is narrower than a first azimuthal profile of the first RADAR sensor.

13. The RADAR sensor system of claim 12, wherein:
   the first RADAR sensor comprises a first antenna that includes a multiple-input multiple-output (MIMO) antenna; and
   the second RADAR sensor comprises a second antenna that includes a beam steering antenna that is directed to a trailer coupled to the vehicle.

14. The RADAR sensor system of claim 12, wherein:
   the first angular range is configured to cover the front of the vehicle; and
   the second angular range is configured to be proximate to at least one sidewall of a trailer coupled to the vehicle.

15. The RADAR sensor system of claim 12, wherein a transmit pattern of a second antenna of the second RADAR sensor comprises power focused in a smaller azimuthal component than a transmit pattern of a first antenna of the first RADAR sensor.

16. The RADAR sensor system of claim 15, wherein the transmit pattern of the second antenna comprises power focused in a second azimuthal component with less than 1 degree azimuthal span and greater than 0.1 degree azimuthal span.

17. The RADAR sensor system of claim 15, wherein a transmit pattern of the first antenna comprises power radiated over a first azimuthal component with greater than 120 degree azimuthal span and less than 180 degree azimuthal span.

18. The RADAR sensor system of claim 12, wherein a transmit pattern of a second antenna of the second RADAR sensor has a primary energy component directed towards a boresight of the second antenna and secondary energy components at azimuthal extremes of the transmit pattern of the second antenna, and wherein the second energy components have less energy than the primary energy component.

19. The RADAR sensor system of claim 12, wherein the second angular range comprises less than thirty degrees and greater than zero degrees.

20. A vehicle control system for a vehicle, the vehicle control system comprising:
   (a) one or more processors; and
   (b) one or more non-transitory, computer-readable media storing instructions that are executable to cause the one or more processors to perform operations comprising:
      (i) obtaining first RADAR data comprising one or more first data points associated with a first angular range of an environment of the vehicle from a first RADAR sensor;
      (ii) obtaining second RADAR data comprising one or more second data points associated with a second angular range of the environment of the vehicle from a second RADAR sensor, wherein the second angular range is closer to a rear of the vehicle than a front of the vehicle, and wherein a second azimuthal profile of the second RADAR sensor is narrower than a first azimuthal profile of the first RADAR sensor; and
      (iii) detecting one or more objects in the environment of the vehicle based on the first RADAR data and the second RADAR data.

* * * * *